(12) United States Patent
Yeh et al.

(10) Patent No.: US 7,616,557 B2
(45) Date of Patent: Nov. 10, 2009

(54) METHOD AND APPARATUS FOR CANCELING INTERCARRIER INTERFERENCE THROUGH CONJUGATE TRANSMISSION FOR MULTICARRIER COMMUNICATION SYSTEMS

(75) Inventors: Hen-Geul Yeh, Cypress, CA (US); Yuan-Kwei Chang, Cerritos, CA (US); Babak Hassibi, San Marino, CA (US)

(73) Assignee: California Institute of Technology, Pasadena, CA (US)

( * ) Notice: Subject to any disclaimer, the term of this patent is extended or adjusted under 35 U.S.C. 154(b) by 695 days.

(21) Appl. No.: 11/130,650

(22) Filed: May 17, 2005

(65) Prior Publication Data

US 2005/0259568 A1 Nov. 24, 2005

Related U.S. Application Data

(60) Provisional application No. 60/571,714, filed on May 17, 2004.

(51) Int. Cl.
H04J 5/04 (2006.01)
(52) U.S. Cl. .................... 370/208; 370/201; 370/210
(58) Field of Classification Search ......... 370/203–210, 370/201
See application file for complete search history.

(56) References Cited

U.S. PATENT DOCUMENTS

| | | | |
|---|---|---|---|
| 6,317,411 B1 * | 11/2001 | Whinnett et al. ............ 370/204 |
| 6,834,043 B1 * | 12/2004 | Vook et al. ................... 370/310 |
| 6,865,237 B1 * | 3/2005 | Boariu et al. ................ 375/295 |
| 7,006,579 B2 * | 2/2006 | Kuchi et al. .................. 375/295 |
| 7,020,072 B1 * | 3/2006 | Li et al. ........................ 370/208 |
| 2006/0126489 A1 * | 6/2006 | Quyang et al. ............... 370/208 |

OTHER PUBLICATIONS

Ahn, J., et al., "Frequency domain equalisation of OFDM signals over frequency nonselective Rayleigh fading channels", *Electron. Lett.*, vol. 29, No. 16, pp. 1476-1477, Aug. 1993.

Al-Dhahir, N., et al., "Optimum finite-length equalization for multicarrier transceivers", *IEEE Trans. Commun.*, vol. 44, No. 1, pp. 56-64, Jan. 1996.

Armstrong, Jean., "Analysis of new and existing methods of reducing intercarrier interference due to carrier frequency offset in OFDM", *IEEE Trans. Commun.*, vol. 47, No. 3, Mar. 1999, pp. 365-369.

Chennakeshu, S., et al., "Error rates for Rayleigh fading multichannel reception of MPSK signals", *IEEE Trans Commun.*, vol. 43, pp. 338-346, 1995.

Coulson, A.J., "Maximum likelihood synchronization for OFDM using a pilot symbol: algorithms", *IEEE Trans. Commun.*, vol. 19, No. 12, pp. 2486-2494, Dec. 2001.

(Continued)

*Primary Examiner*—Huy D. Vu
*Assistant Examiner*—Dady Chery
(74) *Attorney, Agent, or Firm*—Gates & Cooper LLP

(57) ABSTRACT

A system and method for reducing ICI in multicarrier systems is disclosed. The system uses a primary transmission path to transmit a first signal using the same techniques as conventional OFDM and a second transmission path to transmit a conjugate of the first signal. The differing transmission paths can be implemented on separate channels via a variety of multiplexing and/or diversity techniques.

35 Claims, 18 Drawing Sheets

OTHER PUBLICATIONS

Li, Renyuan, et al., "Time-limited orthogonal multicarrier modulation schemes", *IEEE Trans. Commun.*, vol. 43, No. 2/3/4, pp. 1269-1272, Feb./Mar./Apr. 1995.

Muschallik, C., "Improving an OFDM reception using an adaptive Nyquist windowing", *IEEE Trans. Consumer Electron.*, vol. 42, No. 3, pp. 259-269-Aug. 1996.

Moose, Paul H., "A technique for orthogonal frequency division multiplexing frequency offset correction", *IEEE Trans. Commun.*, vol. 42, No. 10, Oct. 1994, pp. 2908-2914.

Rice, M., et al., "Wideband channel model for aeronautical telemetry", *IEEE Transactions on Aerospace and Electronic Systems*, vol. 40, No. 1, Jan. 2004, pp. 57-69.

Seaton, K.A., et al., "Polynomial cancellation coding and finite differences", *IEEE Trans. Inform. Theory*, vol. 46, pp. 311-313, Jan. 2000.

Schmidl, T.M. et al., "Robust frequency and timing synchronization for OFDM", *IEEE Trans. Commun.*, vol. 45, No. 12, pp. 1613-1621, Dec. 1997.

van de Beek, Jan-Jaap, et al., "ML estimation of time and frequency offset in OFDM systems", *IEEE Trans. Signal Processing*, vol. 45, No. 7, pp. 1800-1805, Jul. 1997.

Zhao, Y., et al., "Intercarrier interference self-cancellation scheme for OFDM mobile communication systems", *IEEE Trans. Commun.*, vol. 49, No. 7, pp. 1185-1191, Jul. 2001.

Zhao Y., et al., "Sensitivity to doppler shift and carrier frequency errors in OFDM systems—the consequences and solutions", *Proc. IEEE 46$^{th}$ Vehicular Technology Conf.*, Atlanta, GA, Apr. 1996, pp. 1564-1568.

* cited by examiner

METHOD AND APPARATUS FOR CANCELING INTERCARRIER INTERFERENCE THROUGH CONJUGATE TRANSMISSION FOR MULTICARRIER COMMUNICATION SYSTEMS

CROSS-REFERENCE TO RELATED APPLICATIONS

This application claims benefit of U.S. Provisional Patent Application No. 60/571,714, entitled "A SCHEME FOR CANCELLING INTERCARRIER INTERFERENCE THROUGH CONJUGATE TRANSMISSION FOR MULTI-CARRIER COMMUNICATION SYSTEMS" by Hen-Geul Yeh and Babak Hassibi, filed May 17, 2004, which application is hereby incorporated by reference herein.

BACKGROUND OF THE INVENTION

1. Field of the Invention

The present invention relates to systems and methods for transmitting and receiving signals, and in particular to a system and method for use in reducing intercarrier interference in multicarrier communication systems.

2. Description of the Related Art

In recent years, substantial interest has been shown in multi-carrier communication systems. One such multicarrier communication is orthogonal frequency division multiplexing (OFDM), which has been accepted as the new Institute of Electrical and Electronic Engineers (IEEE) wireless local area network standards (IEEE 802.11). OFDM has also been approved for the metropolitan area networks using fixed broadband wireless according to IEEE 802.16.

OFDM offers a very robust transmission method that is somewhat resistant to wireless channel impairments such as multi-path propagation and frequency-selective fading. OFDM also offers increased immunity to impulse noise and fast fading. As an added bonus, OFDM requires less complex equalization, and therefore simplifies receiver design.

Typically, OFDM uses a rectangular subcarrier pulse. This allows the task of pulse forming and modulation to be performed by a simple Inverse Discrete Fourier Transform (IDFT), which can be implemented as an Inverse Fast Fourier Transform (IFFT).

Advantageously, the receiver needs only an FFT to reverse this operation. The time domain's rectangular pulse transforms into a $$sinc(x) = \frac{\sin \pi x}{\pi x}$$

spectrum in the frequency domain.

OFDM takes advantage of the fact that if two interfering signals are placed at a distance of an integer multiple of the symbol frequency, the peak power corresponding to the sinusoidal component of one signal lines up only with zero power components of the other signal. Orthogonal frequency division extends this concept to include a number of carriers, each spaced at the symbol frequency, thus providing maximum spectral efficiency with (ideally) no interference, producing the orthogonal frequency division. FIG. 1 is a diagram showing a frequency domain representation of an OFDM signal orthogonally multiplexing three (102, 104, and 106) signals. These results can be extended to N suitably spaced subcarriers for a data stream with N symbols.

The overlapping subcarrier spectra allows OFDM systems to provide high spectral efficiency. However, the performance of such multicarrier systems is sensitive to synchronization error, such as frequency, time or phase offsets. Such frequency, time or phase offsets can result from carrier frequency synchronization error or from a Doppler shift due to motion between the transmitter and receiver, and can cause a loss of the carriers' orthogonality, and hence create intercarrier interference (ICI).

Four different approaches for mitigating ICI have been proposed. The first approach is that of ICI self cancellation, which is described in Y. Zhao and S-G. Haggman, "Intercarrier interference self-cancellation scheme for OFDM mobile communication systems," *IEEE Trans. Commun.*, vol. 49, no. 7, pp. 1185-1191, July 2001 (hereinafter referred to as Reference (1)); Y. Zhao and S.-G. Haggman, "Sensitivity to Doppler shift and carrier frequency errors in OFDM systems—The consequences and solutions," *Proc. IEEE 46$^{th}$ Vehicular Technology Conf*, Atlanta, Ga., April 1996, pp. 1564-1568 (hereinafter referred to as Reference (2)); and J. Armstrong, "Analysis of new and existing methods of reducing intercarrier interference due to carrier frequency offset in OFDM," *IEEE Trans. Commun.*, vol. 47, no. 3, March 1999, pp. 365-369 (hereinafter referred to as Reference (3)), all of which are hereby incorporated by reference herein.

The second approach is that of frequency-domain equalization, as described in J. Ahn and H. S. Lee, "Frequency domain equalization of OFDM signal over frequency nonselective Rayleigh fading channels," *Electron. Lett.*, vol. 29, no. 16, pp. 1476-1477, August 1993 (hereinafter referred to as Reference (5)); and N. A. Dhahi et al., "Optimum finite-length equalization for multicarrier transceivers," *IEEE Trans. Commun.*, vol. 44, no. 1, pp. 56-64, January 1996 (hereinafter referred to as Reference (6)), both of which are hereby incorporated by reference herein.

The second approach is that of time-domain windowing, as described in R. Li and G. Stette, "Time-limited orthogonal multicarrier modulation schemes," *IEEE Trans. Commun.*, vol. 43, no. 2/3/4, pp. 1269-1272, February/March/April 1995 (hereinafter referred to as Reference (7)); and C. Muschallik, "Improving an OFDM reception using an adaptive Nyquist windowing," *IEEE Trans. Consumer Electron.*, vol. 42, pp. 259-269, August 1996 hereinafter referred to as Reference (8)), both of which are hereby incorporated by reference herein.

A third approach involves two-path parallel cancellation schemes, as described in H. G. Yeh and C. C. Wang, "New parallel algorithm for mitigating the frequency offset of OFDM systems," *Proc. IEEE Vehicular Technology Fall Conf.*, L. A., C A, September 2004 (hereinafter referred to as Reference (9)); and H. G. Yeh and Y. K. Chang, "A conjugate operation for mitigating intercarrier interference of OFDM systems," *Proc. IEEE Vehicular Technology Fall Conf.*, L. A., C A, September 2004 (hereinafter referred to as Reference (10)), both of which are also hereby incorporated by reference herein.

Finally, frequency offset estimation techniques using training sequence such as pilot symbols are proposed, as described in J.-J van de Beek, M. Sandell, and P. O. Borjesson, "ML estimation of time and frequency offset in OFDM systems," *IEEE Trans. Signal Processing*, vol. 45, no. 7, pp. 1800-1805, July. 1997 (hereinafter referred to as Reference (11)), and T. M. Schmidl and D. C. Cox, "Robust frequency and timing synchronization for OFDM," *IEEE Trans Commun.*, vol. 45, pp. 1613-1621, December 1997 (hereinafter referred to as Reference (12)), both of which are also hereby incorporated by reference herein However, the foregoing techniques do not readily account for frequency offset estimation errors due to unexpected Doppler shifts due to the relative velocity between the transmitter and receiver (common in moving communication systems), nor any frequency offset errors that are less than five percent of the subcarrier frequency spacing 108, as is typically the case when phase, frequency, and timing synchronization has been accomplished by use of repeated preamble sequences.

There is therefore a need for a method for reducing ICI in multicarrier systems that results from sources that are difficult to predict or model, and which cannot be easily ameliorated with synchronization techniques. The present invention satisfies that need.

SUMMARY OF THE INVENTION

A system and method for reducing ICI in multicarrier systems is disclosed. The system uses a primary transmission path to transmit a first signal using the same techniques as conventional OFDM and a second transmission path to transmit a conjugate of the first signal. The differing transmission paths can be implemented on separate channels via a variety of multiplexing and/or diversity techniques. The disclosed embodiments assume that the transmission channels are subject to additive white Gaussian noise (AGWN) and fading, and that synchronization, including phase, frequency, and timing, has been accomplished (e.g. by use of techniques known in the art such as repeated preamble sequences), but that some ICI remains due to frequency offsets between the transmitter carrier frequency and the receiver local oscillator (LO). Typically, such errors are due to frequency offset estimate error or unexpected doppler shifts due to the relative velocity between the receiver and the transmitter and are less than 5% of the subcarrier frequency spacing $f_s$.

The conjugate cancellation (CC) technique provides a high signal to interference power ratio (SIR) in the presence of small frequency offsets (50 dB and 30 dB higher than that of the standard OFDM, at $\Delta fT=0.1\%$ and $\Delta fT=1\%$ of subcarrier frequency spacing, respectively). This CC OFDM system works significantly better than a regular OFDM system if the total frequency offsets are less than 25% of the subcarrier frequency spacing in AWGN channels. It also outperforms a regular OFDM system in frequency selective fading channels, such as the system disclosed in S. Chennakeshu and J. B. Anderson, "Error rates for Rayleigh fading multichannel reception of MPSK signals," *IEEE Trans Commun., vol.* 43, pp. 338-346, 1995, also incorporated by reference herein.

In one embodiment, the present invention can be described as a method for transmitting information in a multicarrier communication system, which comprises the steps of generating a first signal $x_k$ comprising an orthogonal frequency division multiplexed (OFDM) data stream $d_n$, generating a second signal $x'_k$ comprising a complex conjugate of the first signal $x_k$, and transmitting the first signal $x_k$ on a first channel and the second signal $x'_k$ on a second channel. Another embodiment of the present invention can be described as a method for receiving a signal having a multiplexed first signal $x_k$ and second signal $x'_k$, the first signal having an orthogonal frequency division multiplexed (OFDM) data stream $d_n$ and the second signal $x'_k$ having a conjugate of the first signal $x_k$, demultiplexing the received signal to produce a received first signal $r_k$ and a received second signal $r'_k$, generating a conjugate of the received second signal $(r'_k)^*$, and generating the information from the received first signal $r_k$ and the conjugate of the received second signal $(r'_k)^*$ The present invention can also be described as an apparatus for transmitting information in a multicarrier communication system or an apparatus for receiving such information. The transmitter can include an orthogonal frequency division multiplexer for generating a first signal $x_k$ comprising an orthogonal frequency division multiplexed (OFDM) data stream $d_n$, a signal conjugator, communicatively coupled to the orthogonal frequency division multiplexer for generating a second signal $x'_k$ comprising a conjugate of the first signal $x_k$, and a multiplex transmitter module, communicatively coupled to the orthogonal frequency division multiplexer and the signal conjugator, for transmitting the first signal $x_k$ on a first channel and the second signal $x'_k$ on a second channel. The receiver may include a demultiplex receiver module, for receiving and demultiplexing a signal having a multiplexed first signal $x_k$ and a second signal $x'_k$, the first signal $x_k$ having an orthogonal frequency division multiplexed (OFDM) data stream $d_n$ and the second signal $x'_k$ having a conjugate of the first signal $x_k$ to produce a first received signal $r_k$ and a received second signal $r'_k$, a signal conjugator, coupled to the demultiplexer module for generating a conjugate of the received second signal $(r'_k)^*$, and a conjugate cancellation OFDM demultiplexer, coupled to the demultiplexer and the signal conjugator, for generating the information from a combination of the received first signal and the conjugate of the received second signal $(r'_k)^*$.

BRIEF DESCRIPTION OF THE DRAWINGS

Referring now to the drawings in which like reference numbers represent corresponding parts throughout.

DETAILED DESCRIPTION OF PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Transmitter Model

Figure 2:
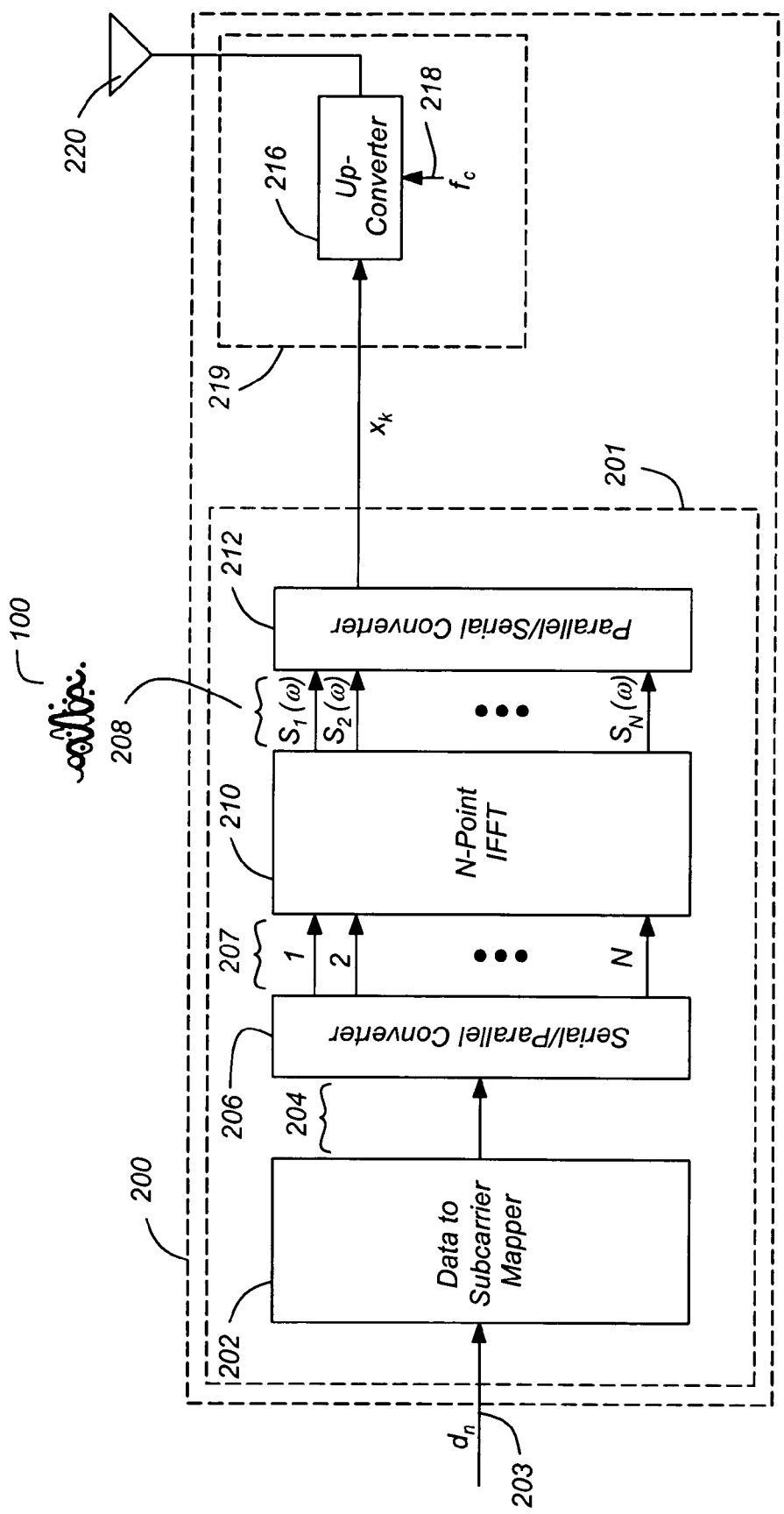
FIG. 2 is a block diagram illustrating embodiment of a conventional OFDM transmitter.

FIG. 2 is a block diagram illustrating embodiment of a conventional OFDM transmitter 200, which comprises an orthogonal frequency division multiplexer 201, coupled to transmitter module 219. The orthogonal frequency division multiplexer 201 comprises a data to subcarrier mapper 202 coupled to an inverse frequency domain transformer 210. The inverse frequency domain transformer 210 can be embodied in a processor implementing an inverse fast Fourier transformer (IFFT) and will be described as such hereinafter. The orthogonal frequency division multiplexer 201 optionally also comprises a serial/parallel converter 206 coupled between the data to subcarrier mapper 202 and a parallel/serial converter 212 coupled between the inverse fast Fourier transformer 210 and the output of the orthogonal frequency division multiplexer 210.

The transmitter module 219 comprises an upconverter 216 and a transmitting antenna 220 coupled to the upconverter 216. The phrase "coupled" as used herein refers to elements that are in communication with one another so as to pass information. Such, communicative coupling does not require physical coupling of elements, nor does it require direct coupling between elements (i.e. elements are still coupled, even though other elements may be interdisposed between the elements of interest).

Figure 1:
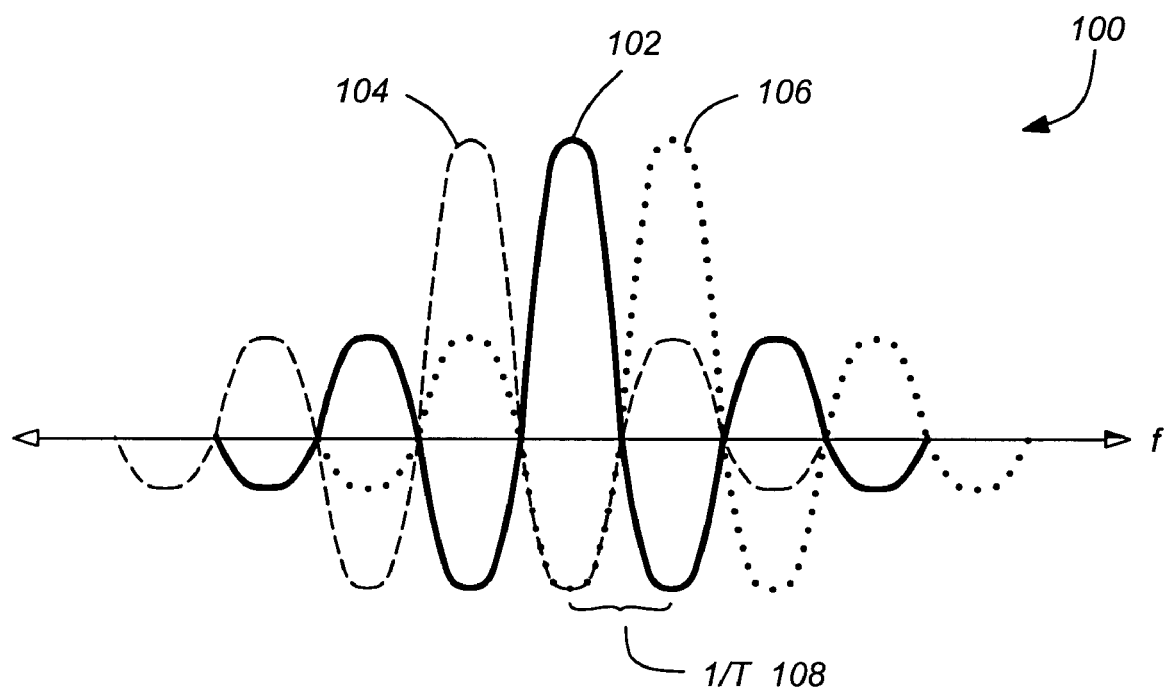
FIG. 1 is a diagram showing a frequency domain representation of an OFDM signal.

A data stream $d_n$ 203 is provided to data to subcarrier mapper 202, which maps the data stream $d_n$ to one of N subcarriers 204 (for example, as shown by the individual traces 102-106 of FIG. 1). The resulting signals are provided to serial/parallel converter 206 and thence to the N-point IFFT 210, thus producing subcarriers $S_1(\omega)$, $S_2(\omega)$ and $S_3(\omega)$ (which may be similar in spectra to signals 102, 104, and 106 illustrated in FIG. 1). The resulting subcarriers 208 are provided to a parallel to serial (P/S) converter 212. This process generates a baseband transmitted signal $x_k$ employing OFDM multiplexing. The output of the IFFT 210 can be written as $$x_k = \sum_{n=0}^{N-1} d_n e^{j\frac{2\pi}{N}nk} \quad k = 0, 1, 2, \ldots, N-1 \qquad (1)$$

where $d_n$ is the data symbol, and $$e^{j\frac{2\pi}{N}nk}, \quad k = 0, 1, \ldots, N-1,$$

represents the corresponding orthogonal frequencies of N subcarriers. Note that the IFFT 210 will have $T_{OFDM}$ seconds to complete the operation described in Equation (1). The duration $T_{OFDM}$ for an OFDM symbol is $N \cdot T_s$, where $T_s$ is the time duration of a data symbol. For simplicity, T is used to represent $T_{OFDM}$ hereafter.

The resulting baseband $x_k$ signal is provided to upconverter 216, which upconverts the signal on the first path ($x_k$) according to a carrier frequency $f_c$ 218. The "upconverting" function, as described herein, includes the processes required to process and transmit the baseband signal $x_k$. Typically, this process includes a digital-to-analog conversion of the baseband signal $x_k$, application of suitable filtering, mixing with an appropriate carrier, and amplification.

Conventional Receiver Processing

Figure 3:
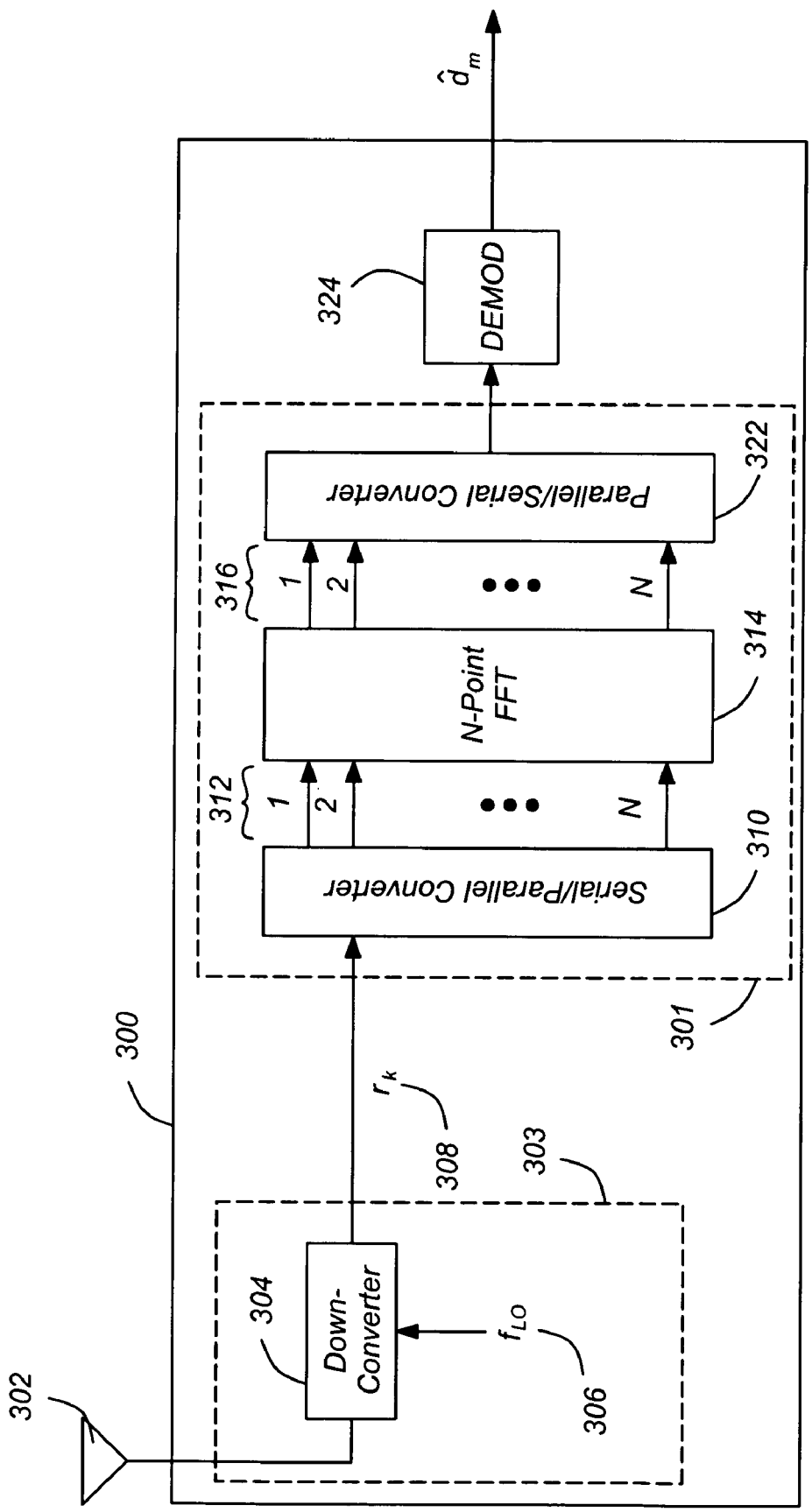
FIG. 3 is a diagram illustrating a conventional OFDM receiver.

FIG. 3 is a diagram illustrating a conventional OFDM receiver 300. The OFDM receiver 300 comprises a receiving module 303 coupled to an OFDM demultiplexer 301. The receiving module 303 comprises a downconverter 304 coupled to a receive antenna 302, and the OFDM multiplexer 301 comprises a frequency domain transformer such as an N-point fast Fourier transformer 314 communicatively coupled to a demodulator 324. The OFDM demultiplexer 301 also optionally includes a serial/parallel converter 310 and a parallel/serial converter 322.

The OFDM signal from the transmitter 200 is sensed by the receive antenna 302 and mixed with a local oscillator signal $f_{LO}$ 306 by downconverter 304. The downconverter 304 also performs any required filtering and digitizes the received signal, as required to generate a received signal $r_k$ 308. The resulting received signal $r_k$ 308 is provided to a serial to parallel converter 310 and processed by an N-point frequency domain transformer 314 (such as a fast Fourier transformer (FFT)) to produce symbol information 316 from each plurality of subcarriers 312. This information is provided to the parallel/serial converter 322 and thence to the demodulator 324 to generate a reproduced data stream $\hat{d}_m$.

If $f_{LO}$ is $\Delta f$ above the carrier frequency $f_c$ of the received OFDM signal due to frequency estimation error or Doppler velocity, the baseband FFT demodulator output is given by $$\hat{d}_m = \frac{1}{N}\sum_{k=0}^{N-1} r_k e^{-j\frac{2\pi}{N}mk} \quad m = 0, 1, 2, \ldots, N-1 \qquad (2)$$

where $$r_k = x_k e^{j\frac{2\pi}{N}k\Delta fT} + w_k$$

represents the received signal 308 at the input to the FFT processor 314, $w_k$ is channel noise (here assumed to be AWGN), and $\hat{d}_m$ is the parallel to serial converted output of the FFT processor 314. The term $$e^{j\frac{2\pi}{N}k\Delta fT}, \quad k = 0, 1, \ldots, N-1,$$

represents the corresponding frequency offset of the received signal at the sampling instants, and $\Delta fT$ is the ratio of the frequency offset $\Delta f$ to subcarrier frequency spacing shown in FIG. 1, or 1/T.

Note that in order to maintain the orthogonality and to prevent crosstalk among subcarriers at the receiver, three conditions must be satisfied: (1) the demodulating subcarriers 314 must to be aligned with the transmitted subcarriers 210; (2) the transmitter 200 modulation process time T must be the same as the receiver 300 demodulation process time T; and (3) the T must be equal to the reciprocal of the subcarrier frequency spacing. If one of these conditions is not met, the orthogonality is no longer maintained and ICI or crosstalk is generated among these subcarriers at the receiver 300. Unfortunately, one of the major disadvantages of an OFDM system is the sensitivity of its performance to synchronization error, including frequency offsets. Such frequency offsets cause a loss of subcarriers' orthogonality, and hence ICI occurs. As a result, the desired signal is distorted and the bit-error-rate (BER) performance is degraded.

Analysis and Discussion of Data Symbol Weighting Function Due to Frequency Offsets The ICI resulting from the carrier frequency offset is analyzed both mathematically in discrete domain below and presented graphically with continuous curves in the related figures. Following the approach in [References (1)-(3)], expressions can be derived for each demodulated subcarrier at the receiver 300 in terms of each transmitted subcarrier and N complex weighting functions. Without loss of generality, the noise wk in the received signal may be ignored in this analysis. After substituting Equation (1) into (2) and performing some manipulation, it can be shown that $$\hat{d}_m = \frac{1}{N} \sum_{n=0}^{N-1} d_n \sum_{k=0}^{N-1} e^{j\frac{2\pi k}{N}(n-m+\Delta fT)} \quad m=0,1,2,\ldots,N-1 \quad (3)$$

Taking the advantage of the properties of geometric series, the foregoing result can be expressed as shown in Equation (4) below $$\hat{d}_m = \frac{1}{N} \sum_{n=0}^{N-1} d_n \frac{1-e^{j2\pi(n-m+\Delta fT)}}{1-e^{j\frac{2\pi}{N}(n-m+\Delta fT)}} \quad (4)$$

$$= \sum_{n=0}^{N-1} d_n u_{n-m}$$

$$= d_m u_0 + \sum_{\substack{n=0 \\ n \neq m}}^{N-1} d_n u_{n-m} \quad m=0,1,2,\ldots,N-1$$

where $$u_{n-m} = \frac{1}{N} \frac{1-e^{j2\pi(n-m+\Delta fT)}}{1-e^{j\frac{2\pi}{N}(n-m+\Delta fT)}} \quad (5)$$

In the above derivation, the complex weighting functions $u_0, u_1, \ldots, u_{N-1}$ indicate the contribution of each of the N data symbols $d_n$ to the FFT 314 output $\hat{d}_m$. The first term of Equation (4) is the desirable data $d_m$ with the weighting function $u_0$. Those terms of $n \neq m$ represent the crosstalk from the undesired data symbols. The weighting function of the IFFT $(d_n)$–FFT$(r_k)$ pair, the transmitter-receiver (200-300) operation, is a periodic function with a period equal to N. If the normalized frequency offset $\Delta fT$ is zero, then $\hat{d}_m$ is equal to $d_n$ at m=n.

With some algebraic manipulations, Equation (5) can be rewritten as $$u_{n-m} = e^{j\frac{\pi}{N}(N-1)(n-m+\Delta fT)} \frac{1}{N} \frac{\sin(\pi(n-m+\Delta fT))}{\sin\left(\frac{\pi}{N}(n-m+\Delta fT)\right)} \quad (6)$$

Equation (6) includes of the rotation factor $$e^{j\frac{\pi}{N}(N-1)(n-m+\Delta fT)}$$

and the Dirichlet function $$\frac{1}{N} \frac{\sin(\pi(n-m+\Delta fT))}{\sin\left(\frac{\pi}{N}(n-m+\Delta fT)\right)}.$$

Figure 4:
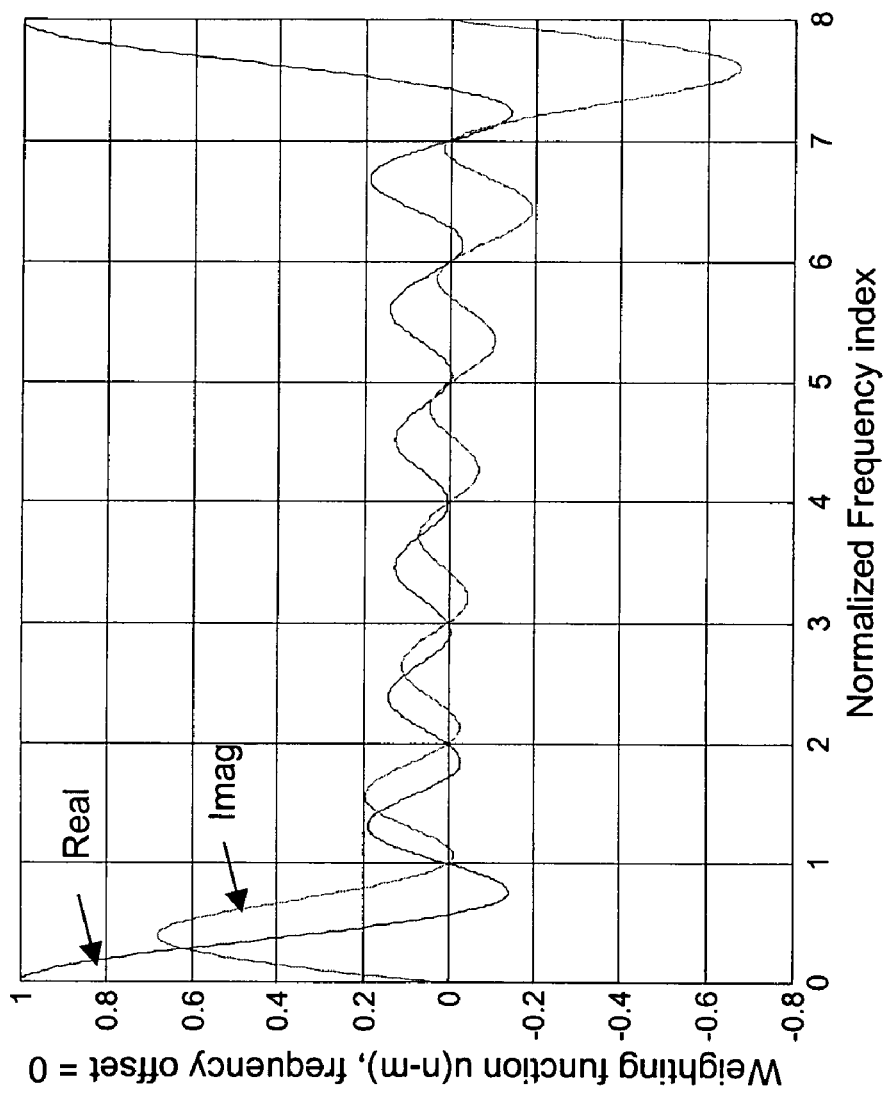
FIGS. 4 and 5 are diagrams graphically depicting weighting functions of a conventional OFDM system.

FIG. 4 is an plot graphically depicting weighting functions with continuous curves over a complete cycle wherein N=8, m=0, and ΔfT=0, and wherein the range of the normalized frequency index n is set from zero to eight. Note that there are small approximately anti-symmetrical regions around the zero-crossing points at the integer indexes n=1, 2, 3, 5, 6 and 7 for the real weighting function. Similarly, there are small approximately anti-symmetrical regions around all zero-crossing points at the integer indexes n=1, . . . , 7 for the imaginary weighting function. These small approximately anti-symmetrical regions around the zero-crossing points at the majority integer indexes are very useful for ICI cancellation as explained below.

Figure 5:
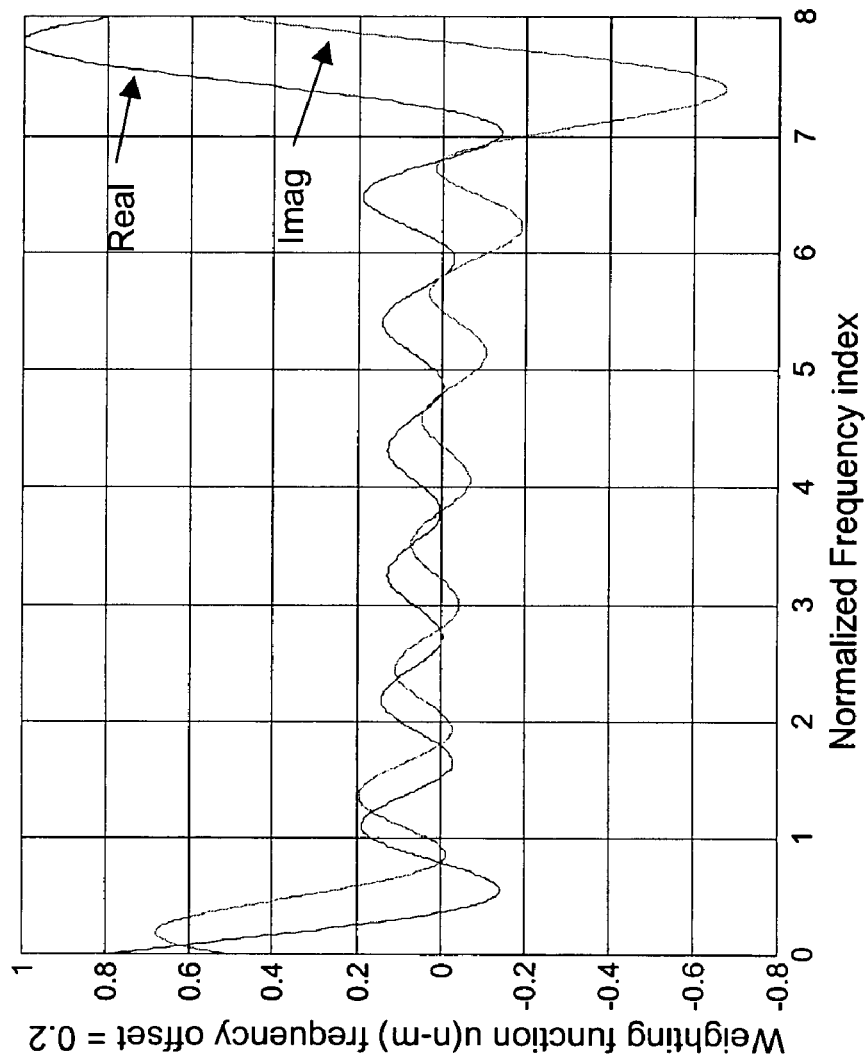

The discrete weighting functions $u_l$, l=0, 1, 2, . . . , 7 of 8 symbols are located exactly at n=0, 1, . . . , 7 integer-point of the index n axis regardless of the frequency offset ΔfT. Given ΔfT=0, all weighting functions are zeroes except that the real part of $u_o$ equals one. This is because all subcarriers hold the orthogonality and have no crosstalk among them at the receiver. In other words, if there is no AWGN and the frequency offset ΔfT equals zero, then the FFT receiver demodulates all 8 data symbols precisely. However, the curves of the weighting function of FIG. 4 are shifted to the left when the frequency offset ΔfT=0.2 as shown in FIG. 5. Similarly, the curves of the weighting function of FIG. 4 will shift to the right by ΔfT if the frequency offset ΔfT is less than zero. This implies that there is ICI from undesired data samples to a particular data sample of interest. Such a shift causes a loss of the subcarriers' orthogonality, and hence all weights on data symbols are non-zero valued and ICI is self-generated.

Conjugate Cancellation Techniques and Architectural Embodiments

The impact of ICI can be mitigated using the conjugate algorithm described below. Fundamentally, the conjugate algorithm by providing weighting factors with opposite polarities at the zero crossings described above.

This can be achieved by using a related transmission on a second (and independent) communication path, assuming that the frequency offset is a constant over the two-path time interval. To do this, this algorithm produces the weighting curves similar to those of FIG. 4, but shifted to the right (instead of left) by ΔfT when the frequency offset ΔfT is greater than zero. This shift-to-right operation changes the weighting functions from zero to negative or positive values in the opposite direction of that of the shift-to-left operation. The combined weighting functions of the two-path operation provide a significantly smaller weighting function on undesired data symbols while maintaining the same weighting function on the desired data symbol for small frequency offsets around the zero crossing points. This operation is illustrated below.

Parallel Architecture

Figure 6A:
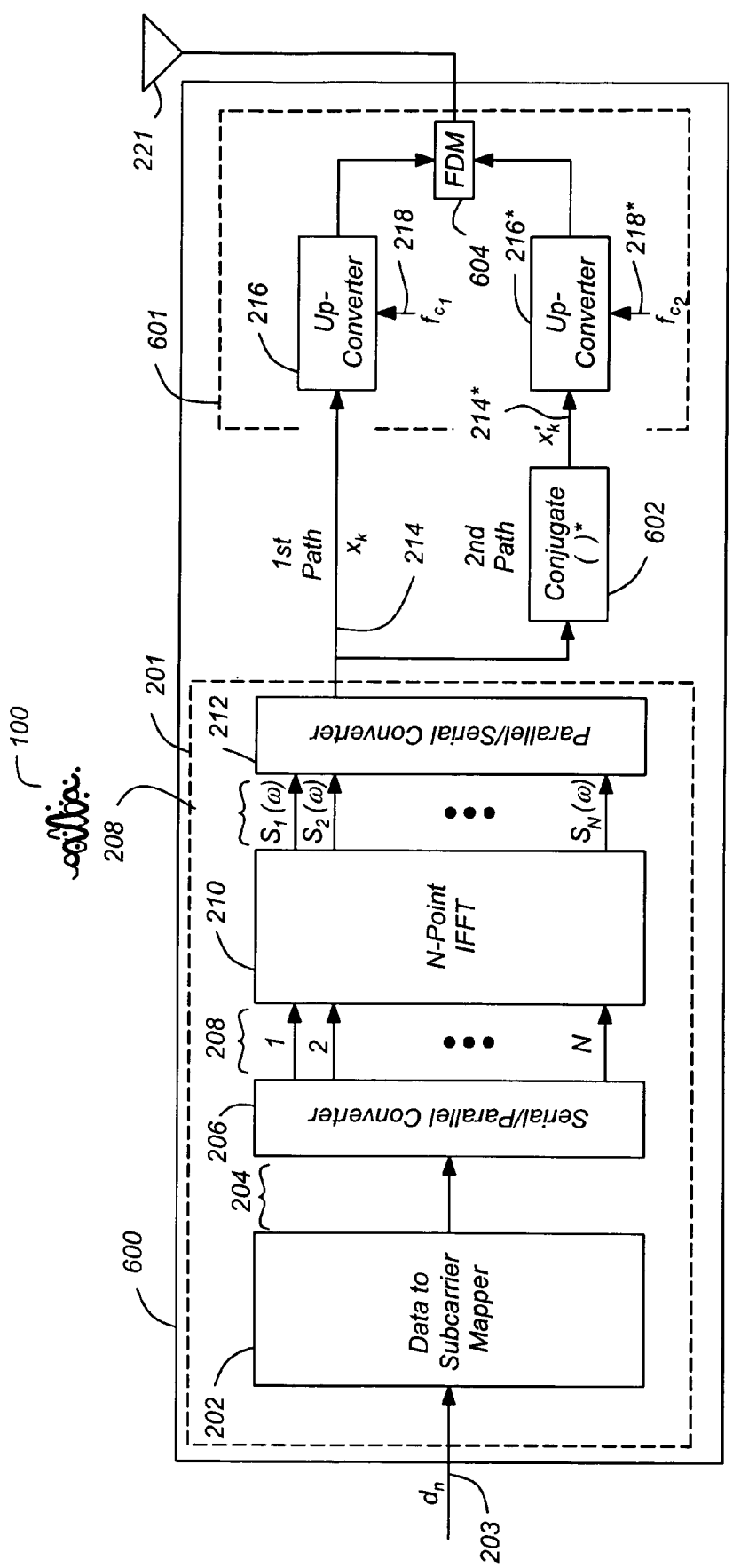
FIG. 6A is a diagram illustrating one embodiment of a conjugate multicarrier transmitter using frequency division multiplexing (FDM)

FIG. 6A is a diagram illustrating one embodiment of a conjugate multicarrier transmitter 600. This embodiment uses a single antenna 220 to transmit the first channel modulated on a first carrier frequency and the second channel on a second frequency. As shown in FIG. 6A, in addition to the elements in a conventional OFDM transmitter 200 shown in FIG. 2, the conjugate OFDM transmitter 600 includes a second data path that is conjugated with a signal conjugator 602, and in that the first data path and conjugated second data paths are multiplexed and transmitted by a multiplex transmitter module 601.

The conjugator 602 generates a conjugate of the output of the IFFT 210 as defined in Equation (7):

$$x'_k = \left(\sum_{n=0}^{N-1} d_n e^{j\frac{2\pi}{N}nk}\right)^* = \sum_{n=0}^{N-1} (d_n)^* e^{-j\frac{2\pi}{N}nk} \quad k = 0, 1, 2, \ldots, N-1 \quad (7)$$

where $d_n$ is the data symbol, and $$e^{-j\frac{2\pi}{N}nk}, \quad k = 0, 1, \ldots, N-1,$$

represents the corresponding orthogonal frequencies of N subcarriers.

Note that in order to demodulate the original signal $x_k$ 214 and the conjugate signal $x'_k$ 214* separately, the conjugate signal $x'_k$ 214* must be transmitted independently. In the embodiment illustrated in FIG. 6A, this is accomplished via two channels implemented frequency division multiplexing (FDM). In other words, the first path signal $x_k$ 214 from the IFFT 210 is transmitted on a first channel while the conjugate $x'_k$ 214* is transmitted on a second channel. The first path signal $x_k$ 214 is frequency up-converted by first upconverter 216 to a carrier frequency $f_{c_1}$ 218, and the conjugate $x'_k$ 214* is upconverted by second upconverter 216* to a carrier frequency $f_{c_2}$ 218* before transmission. The upconverted signals are provided to a frequency division multiplexer 604 (typically, a mixer) and provided to antenna 221 for transmission. Although this embodiment shows the use of mixer and both signals being transmitted on a single antenna 221, the foregoing can also be implemented without a mixer and/or by use of two antennas instead of one. The first carrier frequency $f_{c_1}$ 218 and the second carrier frequency $f_{c_2}$ 218* must be chosen far enough apart, so that the first channel transmission and the second channel transmission do not interfere with one another.

Figure 6B:
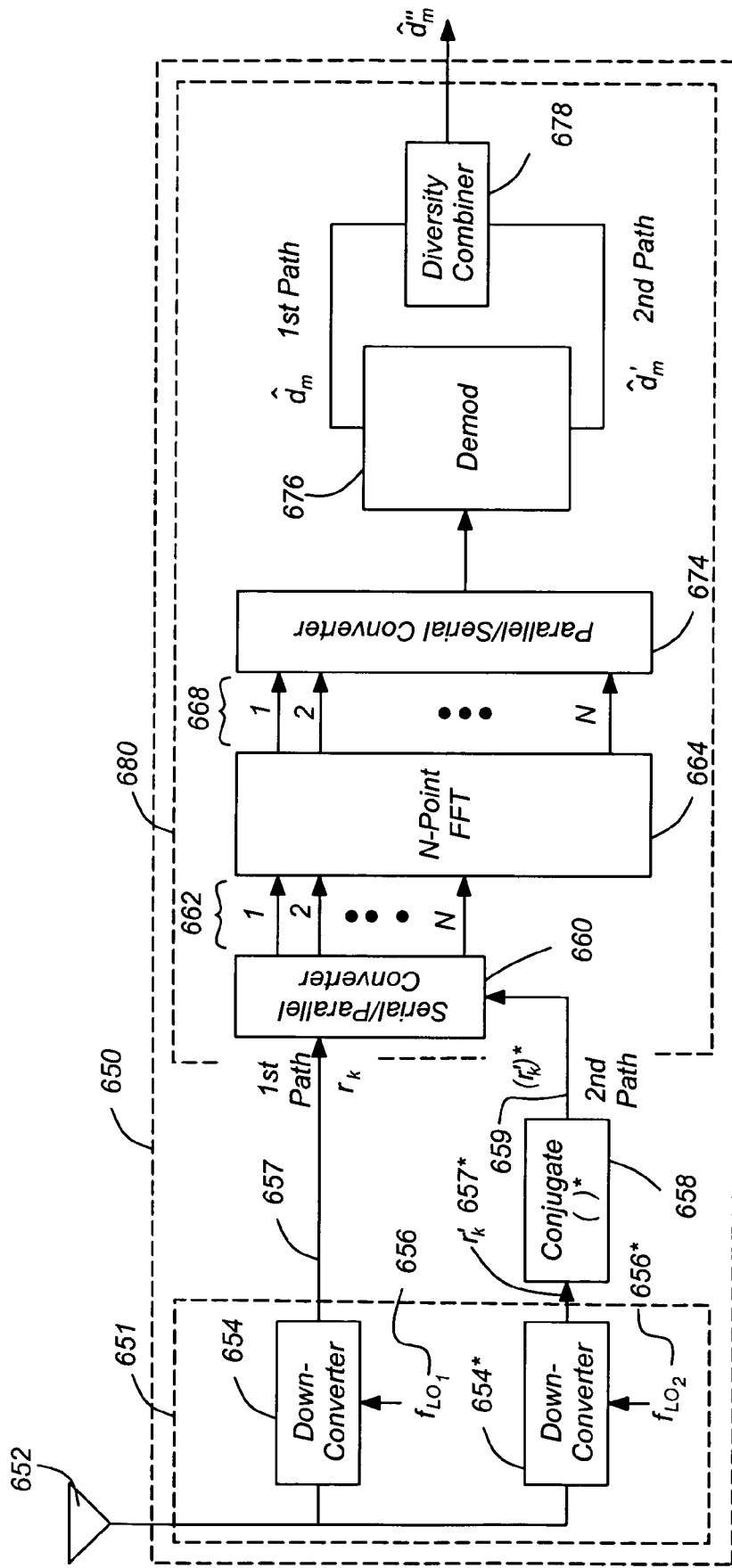
FIG. 6B is a diagram illustrating one embodiment of a conjugate multicarrier receiver using FDDM.

FIG. 6B is a diagram illustrating one embodiment of the receiver 650 for receiving the signal transmitted by the transmitter 600 depicted in FIG. 6A. The receiver 650 comprises a demultiplexer module 651 coupled to a receiver conjugator 658 and a conjugate cancellation orthogonal frequency division demultiplexer (CCOFDM) 680. In this FDDM embodiment, the demultiplexer module 651 comprises a first downconverter 654 and a second downconverter 654*. The receiver antenna 652 senses the signal transmitted by the transmitter 600, and the signal is downconverted by the first downconverter 654 operating according to a local oscillator frequency $f_{LO_1}$ 656 to recover the first channel and by the second downconverter 654* operating according to a second local oscillator frequency $f_{LO_2}$ 656* to recover the second channel. Although the foregoing illustrates the use of a single receiver antenna 652, separate antennas may be used to receover the first channel and the second channel.

The signal on the second channel 657* (which was conjugated before transmission by the transmitter conjugator 602) is again conjugated by the receiver conjugator 658, thus generating a conjugate of the signal received on the second channel $(r'_k)^*$ 659. The downconverted first signal 657 and conjugate of the downconverted second signal 659 are provided to the CCOFDM demultiplexer 680, where a serial/parallel converter 660 converts the signal to a parallel signal 662. The parallel signal 662 is provided to a frequency domain transformer 664 (such as an N-point fast Fourier transformer 664), which performs the FFT operation.

The result of the FFT operation applied to the conjugated signal $r'_k$ on the second channel as defined in Equation (8) below:

$$\hat{d}'_m = \frac{1}{N} \sum_{k=0}^{N-1} (r'_k)^* e^{-j\frac{2\pi}{N}mk} \quad m = 0, 1, 2, \ldots, N-1 \quad (8)$$

where $$r'_k = x'_k e^{j\frac{2\pi}{N}k\Delta fT} + w'_k$$

represents the received signal, $w'_k$ is the independent AWGN, and $\hat{d}'_m$ is the output of the FFT processor 664. The term $$e^{j\frac{2\pi}{N}k\Delta fT}, \quad k = 0, 1, \ldots, N-1,$$

represents the corresponding frequency offset of the received signal at the sampling instants. For purposes of analysis and without loss of generality, the noise $w'_k$ can be ignored.

Substituting Equation (7) into Equation (8) and after some manipulation, it can be shown that $$\hat{d}'_m = \frac{1}{N} \sum_{n=0}^{N-1} d_n \sum_{k=0}^{N-1} e^{j\frac{2\pi k}{N}(n-m-\Delta fT)} \quad (9)$$

$$= \sum_{n=0}^{N-1} d_n v_{n-m}$$

$$= d_m v_o + \sum_{\substack{n=0 \\ n \neq m}}^{N-1} d_n v_{n-m} \quad m = 0, 1, 2, \ldots, N-1$$

where the weighting functions for data $d_n$ at the FFT output 668 is:

$$v_{n-m} = e^{j\frac{\pi}{N}(N-1)(n-m-\Delta fT)} \frac{1}{N} \frac{\sin(\pi(n-m-\Delta fT))}{\sin\left(\frac{\pi}{N}(n-m-\Delta fT)\right)} \quad (10)$$

Equation (10) is similar to (6), but the sign of the frequency offset term, $\Delta fT$, is changed from positive to negative. This weighting function of the (IFFT($d_n$))–FFT(($r'_k$)*) pair, conjugate transmitter-receiver operation, is identical to the weighting function of Equation (6) at $\Delta fT=0$. On the other hand, the frequency offset $\Delta fT>0$, will result in a shift to the right operation on the weighting function of Equation (10) as opposed to a shift to the left of Equation (6).

Referring again to FIG. 6B, the output of the first channel (e.g. IFFT($d_n$)–FFT($r_k$)) and the second (conjugate) channel (e.g. (IFFT($d_n$))*–FFT(($r'_k$)*)) can be demodulated by demodulator 676 and coherently combined via diversity combiner 678 without interfering with each other at the receiver 650. In the embodiment shown in FIG. 6B, this is accomplished via FDM, however, as discussed further below, this can also be accomplished by another division multiplexing technique such as TDM or CDM, or by spatial diversity. In either case, the final detected symbol is then chosen from a combination of the detected symbols of the conventional OFDM receiver (received on the first channel) and those that are detected from the received conjugate (on the second channel). This combination can be implemented as an average as described in Equation (11):

$$\hat{d}''_m = (\hat{d}_m + \hat{d}'_m) \quad (11)$$
$$= \sum_{n=0}^{N-1} d_n(u_{n-m} + v_{n-m})$$
$$= d_m(u_0 + v_0) + \sum_{\substack{n=0 \\ n \ne m}}^{N-1} d_n(u_{n-m} + v_{n-m}) \quad m = 0, 1, 2, \ldots, N-1$$

This averaging operation can be performed by the combiner 678 shown in FIG. 6B. A weighted average of the symbols on the first and second channels can be used, if desired.

FIG. 6B illustrates an embodiment with post-detection combination of the data from each of the channels (e.g. with demodulation before combination). However, the conjugate cancellation technique can also be implemented with pre-detection combination of the data as well (e.g. by first combining the data from each channel and demodulating the result). Hence, the combiner 678 may operate on the signal from the FFT 664, and the combined result provided to a demodulator to generate the output signal $\hat{d}''_m$. This is also the case with the embodiment illustrated in FIG. 11B below.

Figure 7:
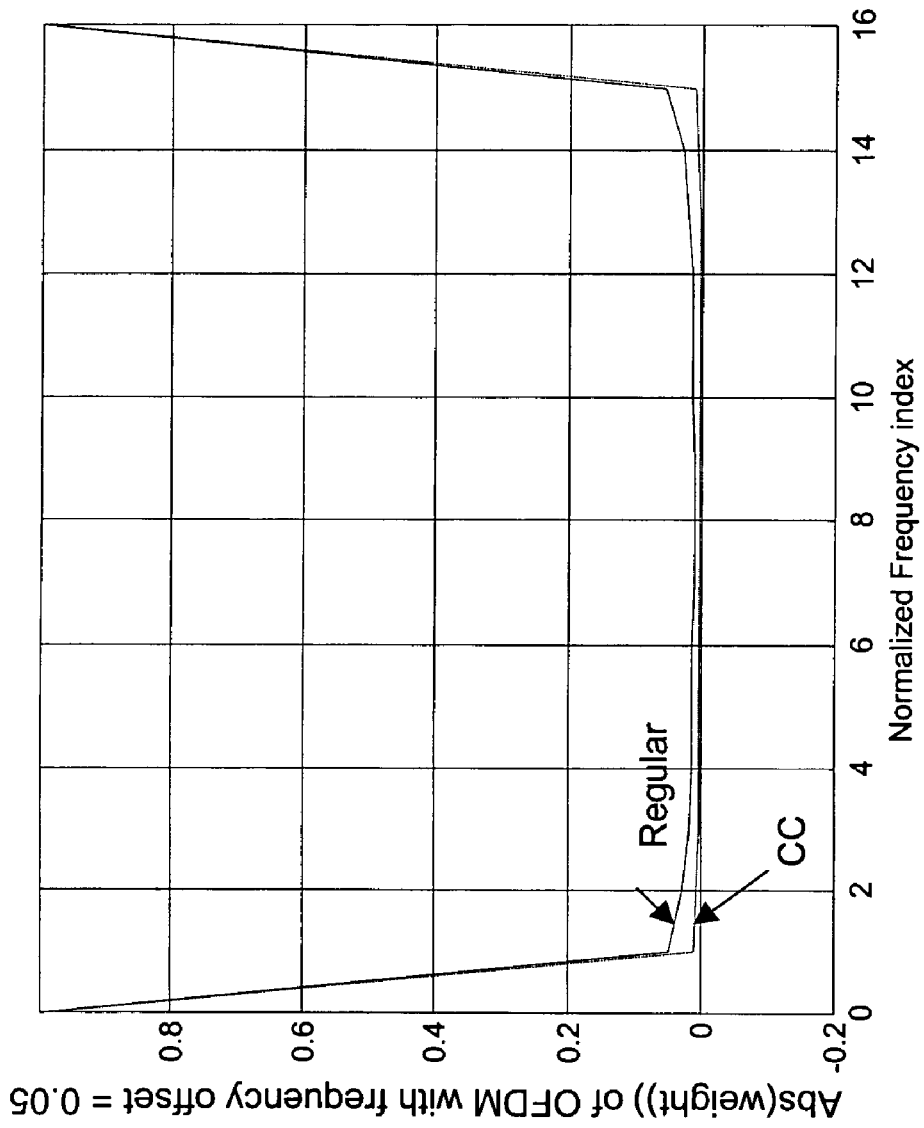
FIG. 7 is a diagram illustrating the magnitude of the discrete weighting factors of both the conventional OFDM and the conjugate cancellation OFDM system at normalized frequency offset=0.05.

FIG. 7 is a diagram illustrating the magnitude of the discrete weighting factors of both the conventional OFDM and the conjugate cancellation OFDM (CCOFDM) for $\Delta fT=0.05$ and $N=16$. Note that the weighting factor at the desired symbol (n=0) of CCOFDM is about the same as that of conventional OFDM. But the discrete weighting factors of CCOFDM at the undesired symbols (n=1, ..., 15) are much less than that of the conventional OFDM.

From Equation (11), the signal to ICI power ratio (SIR) of CCOFDM, as a function of frequency offsets can be derived as $$SIR = 10 \log \frac{|u_0 + v_0|^2}{\sum_{n=1}^{N-1} |u_n + v_n|^2} dB. \quad (12)$$

Note that SIR is independent of the index m. Hence, the index m is dropped from the complex weighting functions $u_{n-m}$ and $v_{n-m}$ of Equation (12).

Figure 8:
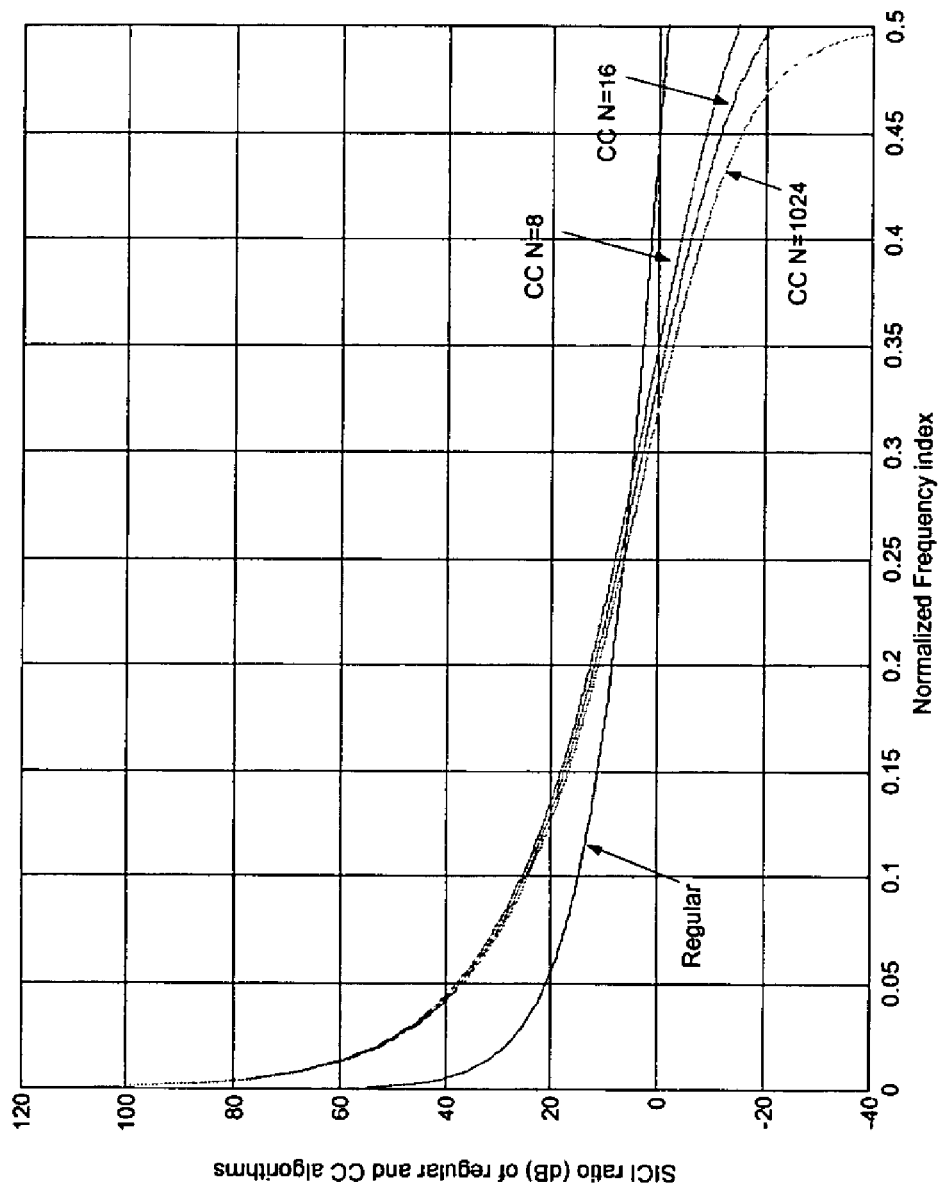
FIG. 8 is a plot of the signal to ICI power ratio of the conjugate cancellation OFDM system, as a function of frequency offsets.

FIG. 8 is a plot of the SIR of the CCOFDM system, as a function of frequency offsets, with N=8, 16, and 1024. Note that the SIR of a conventional OFDM system is independent of N. But the SIR of the CCOFDM system is a function of N for large frequency offsets. For a small frequency offset, the SIR of the CCOFDM system is about the same for different N. It is calculated that the SIR of the CCOFDM system is about 50 dB and 30 dB higher than that of conventional OFDM at 0.1% and 1% frequency offset, respectively. On the other hand, the SIR of the CCOFDM system is smaller than that of conventional OFDM at $\Delta fT>0.25$. This is due to the fact that the anti-symmetrical property around the zero crossing points at the majority integer indexes n of the weighting functions no longer holds. Hence the ICI cancellation used by the CCOFDM system is not as efficient as that of the conventional OFDM system when $\Delta fT>0.25$. However, if such large frequency offsets occur, preamble sequences can be used for re-synchronization.

Figure 9:
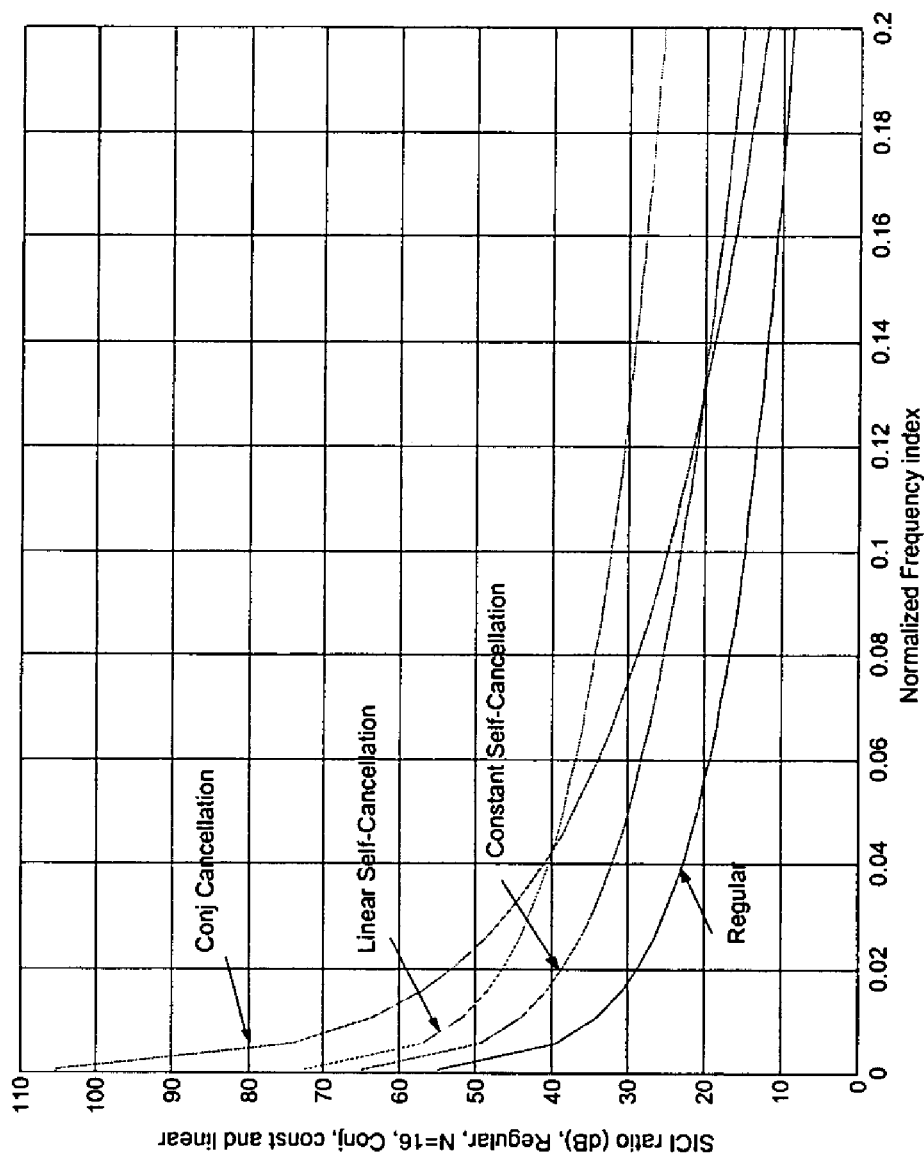
FIG. 9 depicts the SIR for four different systems.

FIG. 9 depicts the SIR for four different systems: conventional OFDM, self-cancellation schemes with constant and linear components of ICI as described in References (1)-(3), and that of the CCOFDM system at N=16. As indicated in References (1)-(3), the self-cancellation schemes are independent of N when N>8. However, the CCOFDM system exhibits a higher SIR than others when frequency offsets are small (33 dB and 13 dB higher than that of a linear self-cancellation system, at $\Delta fT=0.1\%$ and $\Delta fT=1\%$ of subcarrier frequency spacing, respectively).

The embodiment shown in FIG. 6B uses a serial/parallel converter 660 and a companion parallel/serial converter 674, so that only one Fourier transformer 664 and mapper 670 is needed. However, without FDM, the CCOFDM system can also be implemented using two antennas, one for each channel. This embodiment is somewhat similar to a space-time coding architecture disclosed in S. M. Lamouti, "A simple transmit diversity technique for wireless communications," *IEEE journal on Select Areas in Commun.*, vol. 16, no. 8, pp. 1451-1458, October 1998 (hereinafter referred to as Reference (15) and hereby incorporated by reference) but without channel estimators.

Figure 10:
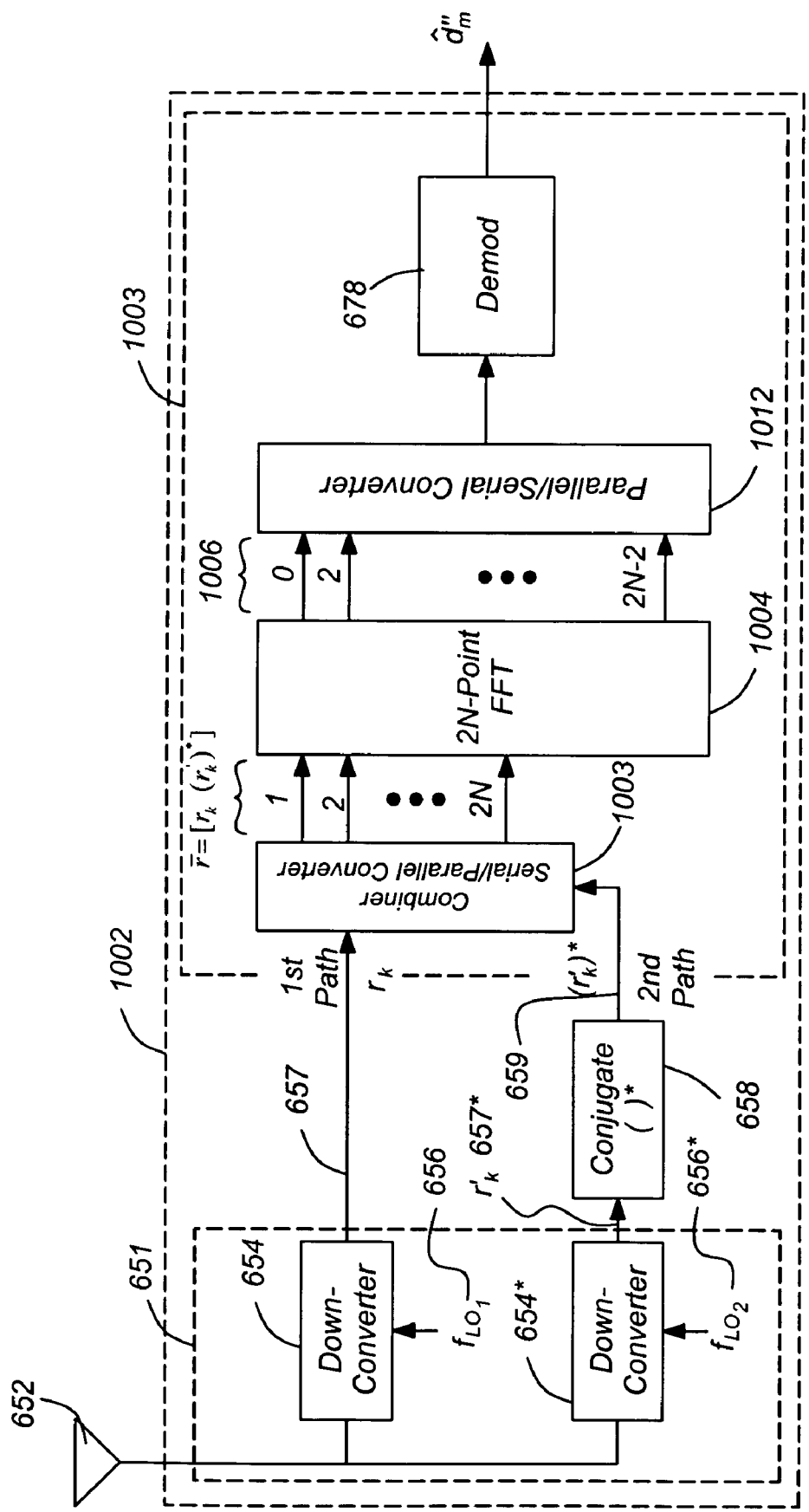
FIG. 10 is a block diagram illustrating an alternative embodiment of the conjugate cancellation ODFM receiver.

FIG. 10 is a block diagram illustrating an alternative embodiment of the CCODFM receiver 1002 and demultiplexing module 1003. In this embodiment, the data received on the first channel 657 and the conjugate of the data received on the second channel 659 is combined or otherwise grouped together and used to form a 2N-element vector as $\bar{r}=[r_k(r'_k)^*]$. The receiver employs a 2N-point fast Fourier transformer 1004 to process $\bar{r}$ as follows.

$$Y_l = \frac{1}{N} \sum_{k=0}^{2N-1} \bar{r} e^{-j\frac{2\pi}{2N}lk} \quad (13)$$

-continued $$= \frac{1}{N}\left(\sum_{k=0}^{N-1} r_k e^{-j\frac{2\pi}{2N}lk} + \sum_{k=0}^{N-1} (r'_k)^* e^{-j\frac{2\pi}{2N}l(N+k)}\right)$$

$$l = 0, 1, 2, \ldots, 2N-1$$

By taking the even FFT output bins (and ignoring odd bins), Equation (13) is identical to Equation (11) as follows:

$$Y_l = \frac{1}{N}\left(\sum_{k=0}^{N-1} r_k e^{-j\frac{2\pi}{2N}lk} + \sum_{k=0}^{N-1} (r'_k)^* e^{-j\frac{2\pi}{2N}lk}\right) \quad (14)$$

$$= \hat{d}_m + \hat{d}'_m$$

$$= \hat{d}''_m$$

$$l = 2m, \quad m = 0, 1, \ldots, N-1$$

The even FFT output bin information 1006 is provided to the parallel/serial converter 1012 and the resulting serial output is demodulated by demodulator 678 to provide the output signal $\hat{d}''_m$.

Since the odd FFT output bins are ignored, the SIR is the same as before. One advantage of the implementation described in FIG. 10 and Equation (13) over that which is described in FIG. 6B and Equation (11) is an improvement on signal-to-noise ratio (SNR) of 3 dB (see, for example C. Muschallik, "Improving an OFDM reception using an adaptive Nyquist windowing," *IEEE Trans. Consumer Electron.*, vol. 42, pp. 259-269, August 1996 (hereinafter referred to as Reference (8)). This is due to the fact that the embodiment mathematically described in Equation (13) has twice as many filters (2N) on the filter bank than that of Equation (11). Since only the even output bins are sampled, and the white noise power is spread across both even and odd bins, only one half of the white noise power contributes to the FFT output.

Further Alternative Embodiments

The foregoing describes a two channel data transmission data transmission system in which the first channel employs the conventional OFDM techniques, and the second channel employs a conjugate transmission at the transmitter and forms a conjugate cancellation at the receiver that mitigates much of the ICI of OFDM systems.

The two channel system that is required to implement the CCOFDM system described in Equation (11) can be implemented in a variety of ways, including different combinations of division multiplexing, and sequential or parallel transmitter and receiver processing embodiments. These additional embodiments are discussed below:

Sequential Post-detection Architecture

Figure 11A:
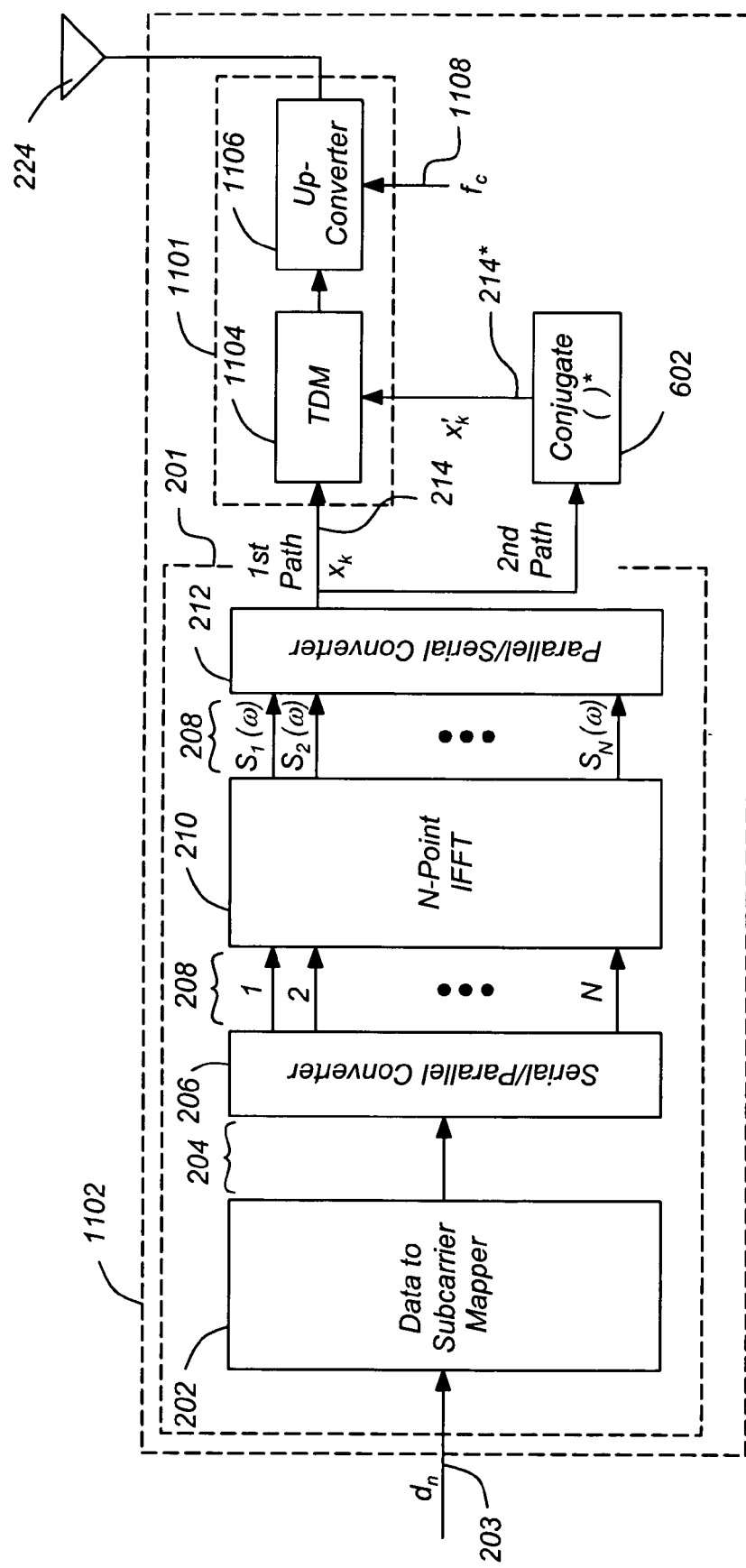
FIGS. 11A and 11B disclose embodiment of the conjugate cancellation OFDM system wherein the first and second channels are implemented by time-division multiplexing (TDM) instead of the FDM used in the system shown in FIGS. 6A and 6B.
Figure 11B:
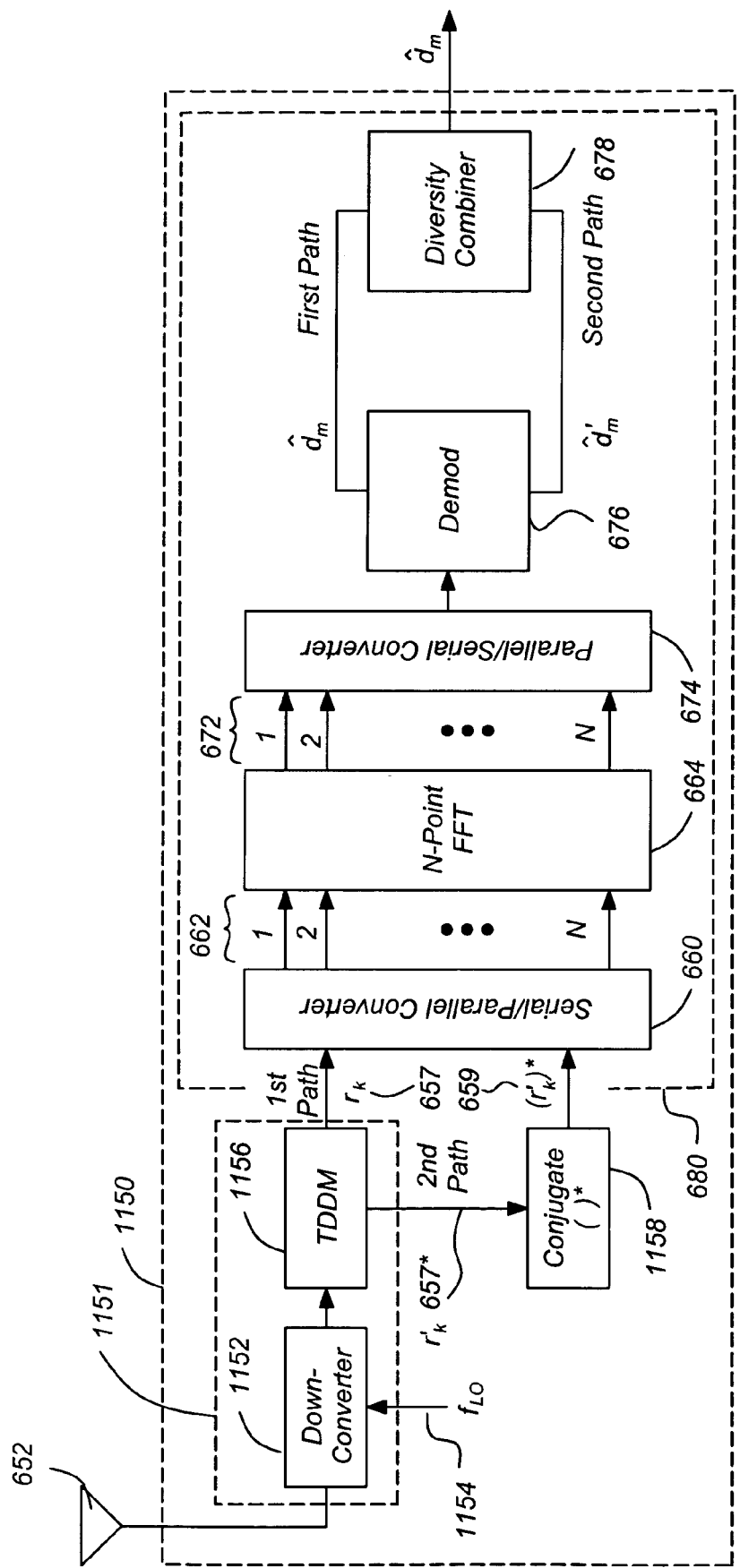

FIGS. 11A and 11B disclose embodiment of the CCOFDM system wherein the first and second channels are implemented by time-division multiplexing instead of the frequency division multiplexing used in the system shown in FIGS. 6A and 6B.

FIG. 11A is a block diagram illustrating the transmitter 1102, and FIG. 11B is a block diagram illustrating the receiver 1150.

The transmitter 1102 comprises an orthogonal frequency division multiplexer 201 coupled to a conjugator 602 and a multiplex transmitter module 1101. In this embodiment, the multiplex transmitter module 1101 comprises communicatively coupled upconverter 1106 and time division multiplexer 1104.

The first (non-conjugated) signal $x_k$ 214 and the second (conjugated) signal $x'_k$ 214* from the transmitter conjugator 602, are provided to a time division multiplexer 1104. The multiplexed first signal $x_k$ 214 and the second signal $x'_k$ 214* are then upconverted to carrier frequency $f_c$ 1108 by upconverter 1106 and provided to the antenna 224 for transmission.

FIG. 11B is a diagram of a receiver 1150 for receiving the signal produced by the transmitter 1102 of FIG. 11A. The signal transmitted by the transmitter 1102 is sensed by the receiver antenna 652, and provided to the demultiplexer module 1151. In this embodiment, the demultiplexer module 1151 comprises a communicatively coupled downconverter operating at local oscillator frequency $f_{LO}$ 1154 and a time division de-multiplexer 1156.

The signal sensed by the receiver antenna 652 is demodulated by the demodulator 1152 according to a local oscillator frequency 1154. The demodulated signal is provided to the time division demultiplexer 1156, which separates the first signal $r_k$ 657 received on the first TDM channel, and the second signal $r'_k$ 657* received on the second TDM channel. The received second signal $r'_k$ 657* is provided to the receiver conjugator 1158, which generates a conjugate of the received second signal $(r'_k)^*$ 659.

Both the received first signal $r_k$ 657 and the conjugate of the received second signal $(r'_k)^*$ 659 are provided to CCOFDM demultiplexer 680. The processing by the serial/parallel converter 660, N-point Fourier transformer 664, demodulator 676, and combiner 678 of the receiver 1150 operates in the same way as the receiver 650 depicted and described in connection with FIG. 6B.

The combiner 678 combines the processed first signal $r_k$ 657 from the first channel and the processed conjugate of the second signal $r'_k$ 659 from the second channel to regenerate the transmitted data stream. Since the signals are combined after detection and is used in conjunction with the TDM embodiment, the combiner 678 may be referred to as a post-detection time diversity combiner.

Instead of the time division multiplexer 1104 and de-multiplexer 1156, the foregoing can be analogously implemented with a code division multiplexer (CDM) and a code division de-multiplexer.

Note that Equation (11) represents the coherent, equal gain diversity combining with the assumption that the signals on the first and second channels have equal energy symbols. The coherency between these two channels can be assured by application of a number of techniques, including the use of preamble sequences or phase-locked loops. Alternatively, differential encoded data may be used for transmission.

If signals received on the first and second channels are determined to have unequal energy (due, for example, to channel fading) the receiver 1150 may use the repeatedly transmitted preamble sequences to estimate the channel parameters, and use maximal ratio combining (MRC) to improve performance. This architecture enjoys simplicity and backward compatibility to the regular OFDM. In fact, the CCOFDM system and it's use of a second channel to transmit conjugate information can be used in transmission/reception systems on an adaptive or optional bases. For example, the CCOFDM system can help reduce ICI in situations where the transmitter and/or the receiver are moving relative to one another, to reduce Doppler-induced frequency errors. Or, the CCOFDM system can be used in any situation where reduced ICI become important.

The architecture used to implement the TDM embodiments of FIGS. 11A and 11B can also be used to implement a CDM embodiment of the CCOFDM. In this case, a code division multiplexer and demultiplexer replaces the time division multiplexer 1104 and demultiplexer 1156 of the TDM embodiment.

Sequential Pre-detection Architecture

Figure 12:
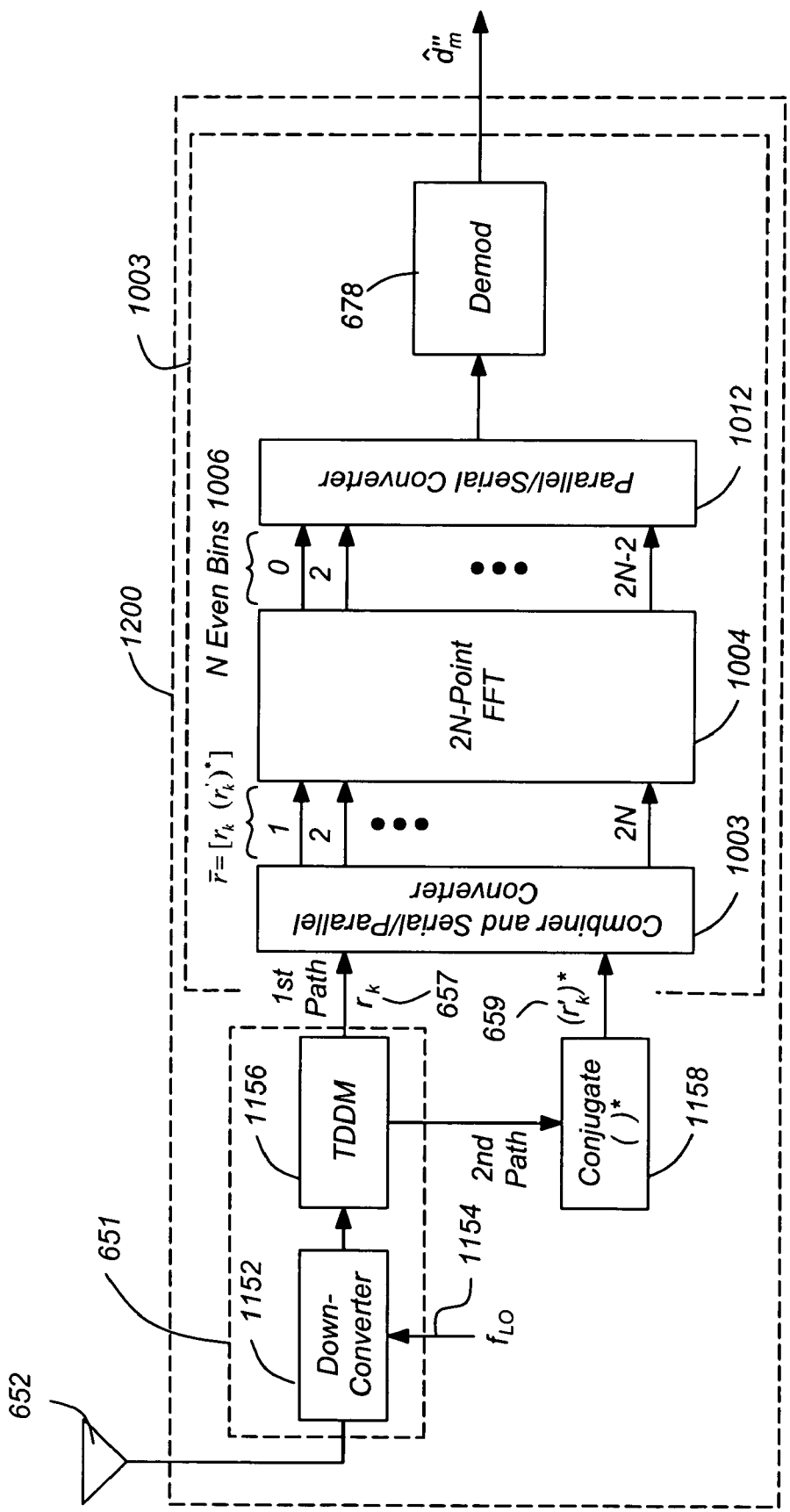
FIG. 12 is a diagram of a TDM embodiment of the conjugate cancellation OFDM receiver.

FIG. 12 is a diagram of a TDM embodiment of the receiver 1150, modified to incorporate the principles discussed in connection with the embodiment illustrated in FIG. 10. In this embodiment, the TDM receiver 1200 computes the combination of the conventional OFDM signal on the first channel and the conjugate OFDM signal on the second channel using the averaging characteristics inherent in the 2N-Point FFT 1004, effectively implementing a combination of pre-detected conventional and conjugate OFDM signals.

In this embodiment, the transmitter 1102 is the same as that which is depicted in FIG. 11A. However, the receiver 1200 utilizes a 2N-point fast Fourier transformer 1004 to process the data combined from the first and second channels to form 2N-element vector $\bar{r}=[r_k(r'_k)^*]$. Only the N even FFT output bins 1006 are provided to the parallel/serial converter 1012 and thence to the demodulator 678.

If the symbols on the first and second channels have equal energy, the FFT processing performed in this embodiment assures equal gain diversity combining. The computation time required for 2N-point FFT is less than that of two N-point FFT computations used in the other embodiments described herein. This architecture also enjoys simplicity and backward compatibility to the conventional OFDM, because the second channel 659, conjugate operation 1158, and 2N-FFT transformer 1004 can be selectively or adaptively applied to enhance the system performance as needed.

Although the two-path conjugate transmission and reception technique can cause a reduction in bandwidth efficiency, the same is true for existing ICI self-cancellation techniques such as those described in Reference (1). Further, the reduced bandwidth efficiency can be compensated for by suitable selection of system parameters. For example, larger signal alphabet sizes can be used, if necessary.

Figure 13:
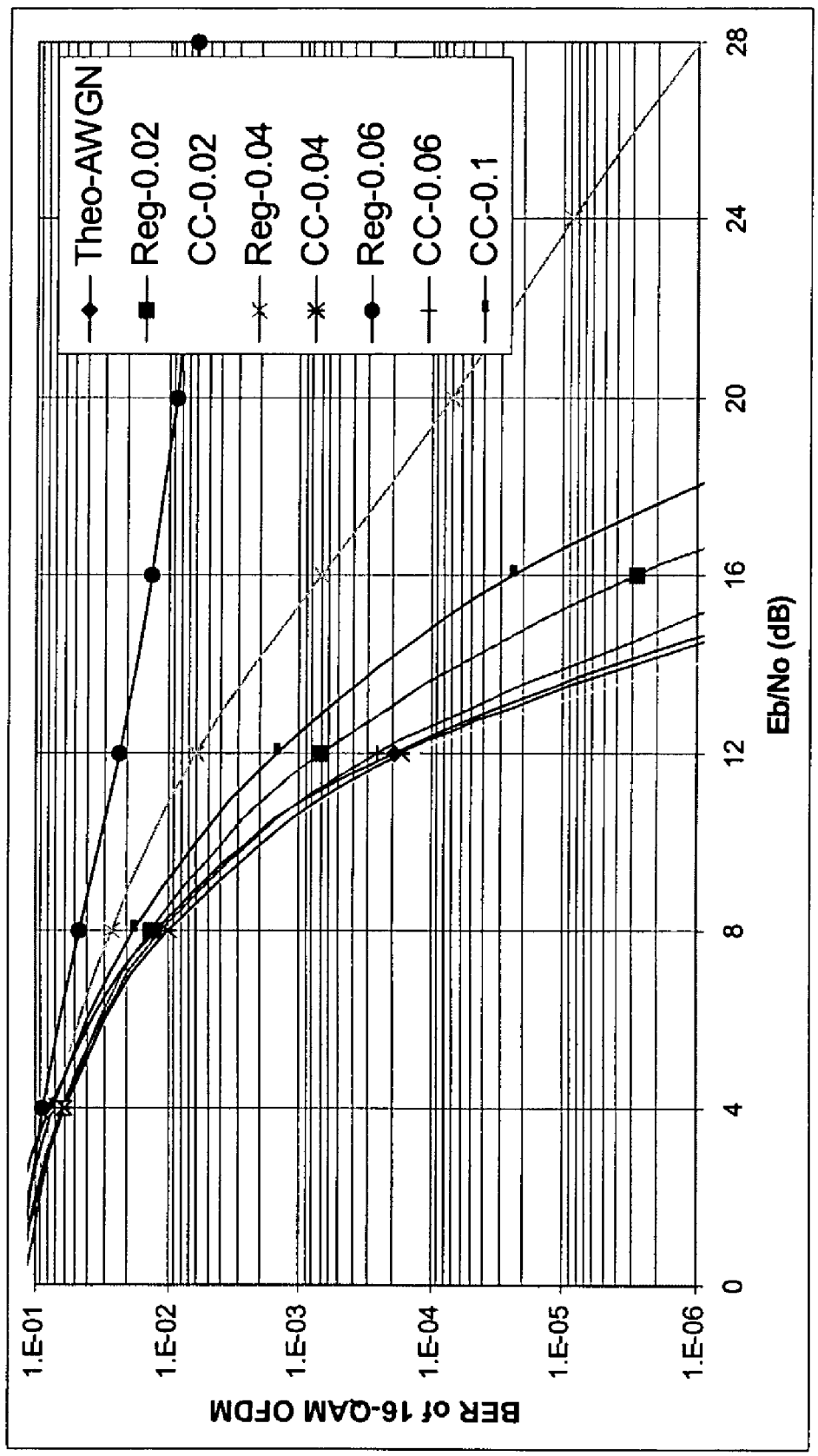
FIG. 13 is a depiction of the performance of a 16 QAM conjugate cancellation OFDM transceiving system illustrated in FIGS. 11A and 11B in AWGN channels.

FIG. 13 is a depiction of the performance of a 16 QAM CCOFDM transceiving system illustrated in FIGS. 11A and 11B. So that the CCOFDM system is fairly compared with the conventional OFDM system, the signal power of each channel transmitted by the transmitter is half of the original signal power of the conventional OFDM system. At N=16, the bit error rate (BER) performance of both regular 16-QAM OFDM and the CCOFDM is depicted, with $\Delta fT$ ranging from 0 to 0.1, respectively, in the AWGN channel. At $\Delta fT=0.04$, FIG. 13 shows that the performance of the CCOFDM system is about the same as the theoretical 16-QAM without frequency offset, and is better than that of conventional OFDM by 13 dB at BER=$10^{-6}$.

Figure 14:
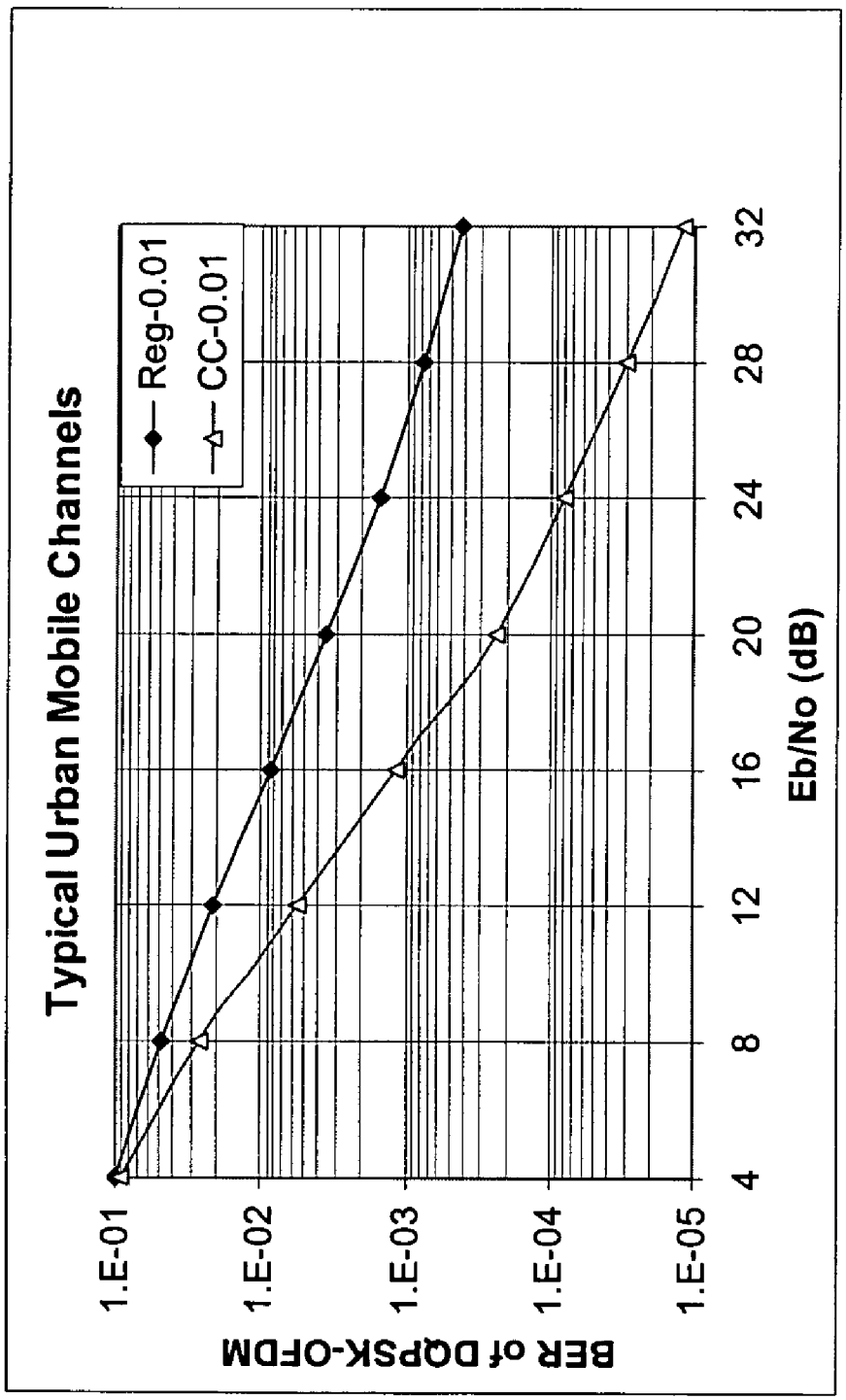
FIG. 14 is a plot of the bit error rate performance of a differential quadrature phase shift keying OFDM system, with and without conjugate cancellation in mobile frequency selective channels.

FIG. 14 is a plot of the BER performance of a differential quadrature phase shift keying (DQPSK) OFDM system, with and without CCOFDM in a typical urban mobile channels. The channel parameters are defined in the GSM Recommendation 5.5, *European Digital Cellular Telecommunication System* (phase 2); Radio Transmission and Reception, Eur. Telecommun. Standards Inst., GSM 05.05, Ver 4.60., July 1993. hereinafter referred to as Reference (14) and incorporated by reference herein). FIG. 14 presents the results for the maximum normalized Doppler spread $\Delta fT=1\%$ of the subcarrier frequency spacing. As shown in FIG. 14, CCOFDM system exhibits significantly better performance than conventional OFDM when Eb/No is greater than 4 dB. Although the equal gain combining is applied here, the BER performance can be further improved if MRC is employed in this frequency selective fading channel.

Figure 15:
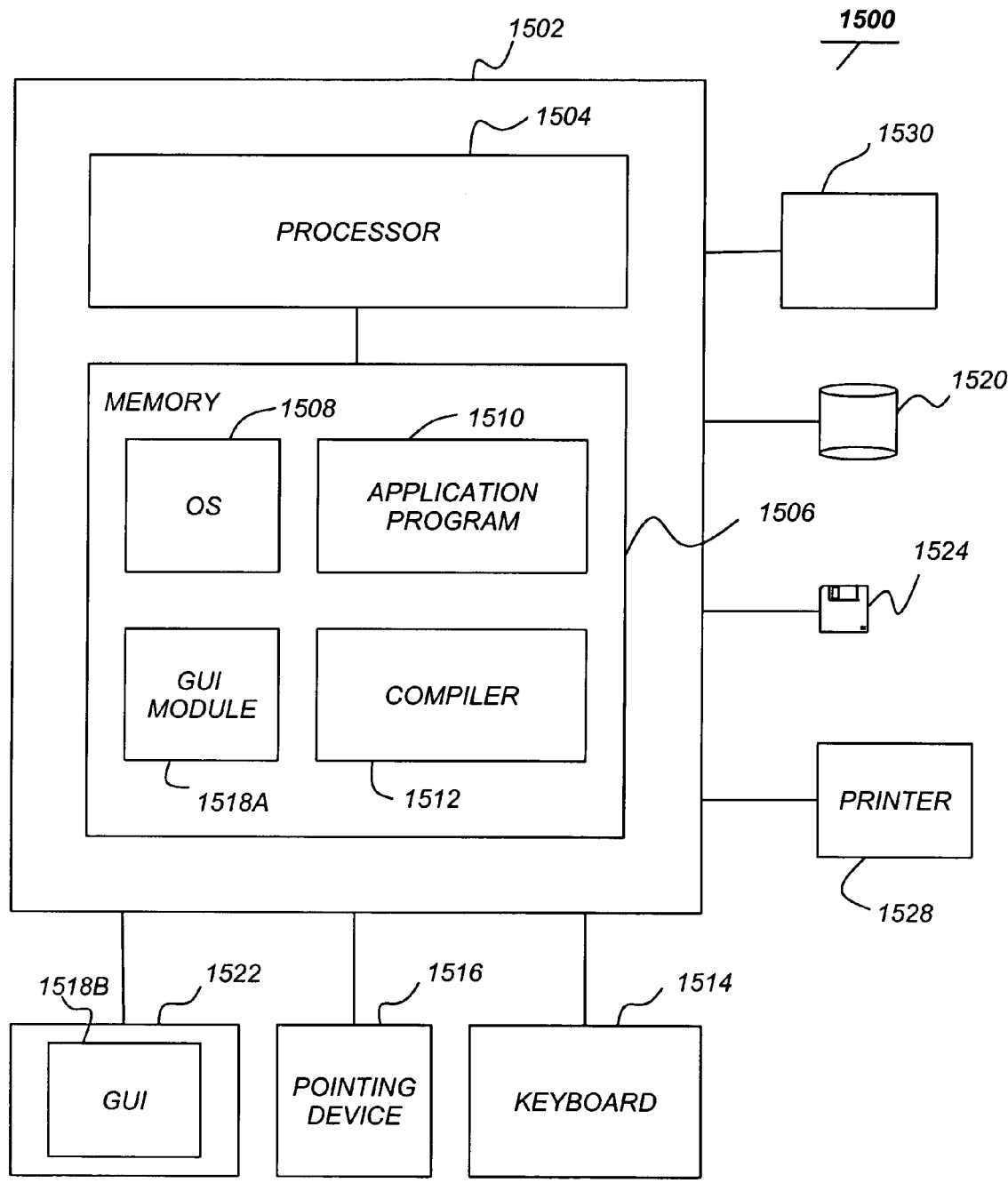
FIG. 15 illustrates an exemplary computer system that could be used to implement elements of the present invention.

FIG. 15 illustrates an exemplary computer system 1500 that could be used to implement elements of the present invention. The computer 1502 comprises a processor 1504 and a memory, such as random access memory (RAM) 1506. The computer 1502 may be operatively coupled to a display 1522, which presents images such as windows to the user on a graphical user interface 1518B. The computer 1502 may be coupled to other devices, such as a keyboard 1514, a mouse device 1516, a printer, etc. Of course, those skilled in the art will recognize that any combination of the above components, or any number of different components, peripherals, and other devices, may be used with the computer 1502.

Generally, the computer 1502 operates under control of an operating system 1508 stored in the memory 1506, and interfaces with the user to accept inputs and commands and to present results through a graphical user interface (GUI) module 1518A. Although the GUI module 1518A is depicted as a separate module, the instructions performing the GUI functions can be resident or distributed in the operating system 1508, the computer program 1510, or implemented with special purpose memory and processors. The computer 1502 also implements a compiler 1512 which allows an application program 1510 written in a programming language such as COBOL, C++, Assembly, MATLAB, FORTRAN, or other language to be translated into processor 1504 readable code. After completion, the application 1510 accesses and manipulates data stored in the memory 1506 of the computer 1502 using the relationships and logic that was generated using the compiler 1512. The computer 1502 also optionally comprises an external communication device such as a modem, satellite link, Ethernet card, or other device for communicating with other computers.

In one embodiment, instructions implementing the operating system 1508, the computer program 1510, and the compiler 1512 are tangibly embodied in a computer-readable medium, e.g., data storage device 1520, which could include one or more fixed or removable data storage devices, such as a zip drive, floppy disc drive 1524, hard drive, CD-ROM drive, tape drive, etc. Further, the operating system 1508 and the computer program 1510 are comprised of instructions which, when read and executed by the computer 1502, causes the computer 1502 to perform the steps necessary to implement and/or use the present invention. Computer program 1510 and/or operating instructions may also be tangibly embodied in memory 1506 and/or data communications devices 1530, thereby making a computer program product or article of manufacture according to the invention. As such, the terms "article of manufacture," "program storage device" and "computer program product" as used herein are intended to encompass a computer program accessible from any computer readable device or media.

Those skilled in the art will recognize many modifications may be made to this configuration without departing from the scope of the present invention. For example, those skilled in the art will recognize that any combination of the above components, or any number of different components, peripherals, and other devices, may be used with the present invention.

Figure 16:
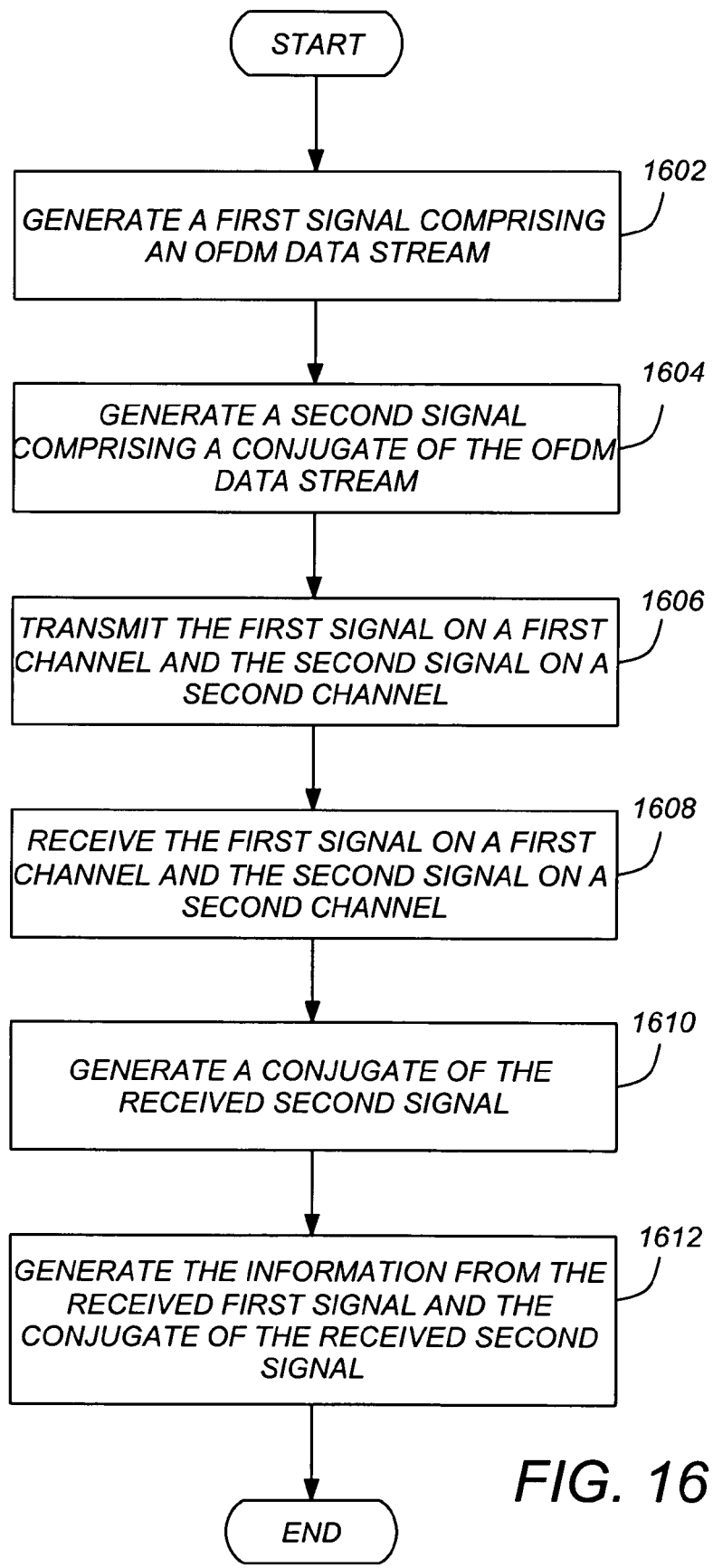
FIG. 16 is a flowchart illustrating exemplary process steps that can be used to implement one embodiment of the conjugate cancellation OFDM system.

FIG. 16 is a flowchart illustrating exemplary process steps that can be used to implement one embodiment of the CCOFDM system. A first signal $x_k$ 214 comprising information is generated comprising an OFDM data stream $d_n$ 203, as shown in block 1602. This can be accomplished, for example, by mapping the data stream $d_n$ 203 to a plurality of orthogonal subcarriers and inverse Fourier transforming the mapped data stream 208.

A second signal $x'_k$ comprising a conjugate of the OFDM data stream $d_n$ 203 is generated. The second signal $x'_k$ can be generated from the first signal $x_k$, or may be generated independently.

In block 1606, the first signal $x_k$ and the second signal $x'_k$ are independently transmitted. This can be accomplished via transmission in different channels (e.g. by use of multiplexing techniques such as TDM, CDM, or FDM, by spatial diversity, or other techniques as described above.

In block 1608, the first signal $x_k$ and the second signal $x'_k$ are received as $r_k$ and $r'_k$, respectively. If the first $x_k$ and second $x'_k$ signals were transmitted in a multiplexed multiplexed form, they are received and demultiplexed using the appropriate techniques. A conjugate of the received second signal $(r'_k)^*$ is generated in block 1610.

Block 1612 then generates the information from the received first signal $r_k$ and the conjugate of the received second signal $(r'_k)^*$. As described above, this operation can be accomplished by detecting the symbols using conventional OFDM techniques, then using a combiner to average the symbols detected from the received first signal $r_k$ and the conjugate of the received second signal $(r'_k)^*$. Or, the information may be generated as a part of the FFT performed in a conventional OFDM technique by creating a vector $\bar{r}$ of dimension 2N from the received signals $r_k$ and $(r'_k)^*$, applying that vector $\bar{r}$ to the 2N-point fast Fourier transformer, and outputting only the even bins of the FFT for subcarrier-to-data mapping.

CONCLUSION

This concludes the description of the preferred embodiments of the present invention. As has been described, when implemented in a parallel architecture, CCOFDM can be viewed as a simplified space-time coding scheme which employs two-antenna for two-branch transmit diversity without penalty on transmission bandwidth. On the other hand, when implemented in a sequential architecture, the CCOFDM must transmit data twice and the bandwidth efficiency is reduced to half However, this difficulty can be compensated by using larger signal alphabet sizes. In either case, the sensitivity of CCOFDM systems to ICI is reduced significantly for small frequency offsets. Furthermore, the CCOFDM system provides a robust OFDM system in both AWGN and fading channels. The CCOFDM system provides a much higher SIR over the existing OFDM system when frequency offsets are small. For example, at a 4% frequency offset and N 16, the SIR of CCOFDM is about 17 dB higher than that of the conventional OFDM and the performance of the CCOFDM system is better than that of conventional OFDM by 13 dB at BER=$10^{-6}$ in the AWGN channel. CCOFDM also provides significantly better BER performance than that of conventional OFDM in frequency selective mobile channels when $E_b/N_o$ is greater than 4 dB.

The foregoing description of the preferred embodiment of the invention has been presented for the purposes of illustration and description. It is not intended to be exhaustive or to limit the invention to the precise form disclosed. Many modifications and variations are possible in light of the above teaching. The foregoing can be implemented using any technique that permits separate channels of information to be independently transmitted and received. In addition to the FDM, CDM, and TDM embodiments described above, separate channels can be implemented using polarization or spatial diversity. For example, a system using polarization diversity could implement the first channel/second channel as left/right polarized channels or right hand circular/left hand circular polarized channels. A system using spatial diversity may use transmission and/or receiving antennas with narrow beamwidths so that different channels can be receive.

It is also noted that while the present invention described independent transmission or transmission using different channels, the received information need not be statistically independent. For example, even if separate channels are used to transmit the data stream and its conjugate, the received signals will not be statistically independent since both channels will generally be subject to statistically correlated channel noise.

These embodiments described herein apply to transmissions at broad frequency ranges, including radio, visible light, and infrared frequencies. The foregoing invention and the elements thereof, can be implemented using one or more processors, including general purpose processors, special purpose processors, or any combination thereof. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. An apparatus for receiving information in a multicarrier communication system, comprising:
   a demultiplex receiver module, for receiving and demultiplexing a signal having a multiplexed first signal $x_k$ and a second signal $x'_k$, the first signal $x_k$ having an orthogonal frequency division multiplexed (OFDM) data stream $d_n$ and the second signal $x'_k$ having a conjugate of the first signal $x_k$ to produce a first received first signal $r_k$ and a received second signal $r'_k$;
   a signal conjugator, coupled to the demultiplexer module, for generating a conjugate of the received second signal $(r'_k)^*$; and
   a conjugate cancellation orthogonal frequency division multiplexed (CCOFDM) demultiplexer, for generating the information from the received first signal $r_k$ and the conjugate of the received second signal $(r'_k)^*$
   wherein the demultiplex receiver module comprises first downconverter for downconverting the signal to produce the received first signal $r_k$ and a second downconverter for downconverting the signal to produce the received second signal $r'_k$;
   wherein the CCOFDM demultiplexer comprises:
   a combiner, for combining the received first signal $r_k$ and the conjugate of the received second signal $(r'_k)^*$; and
   a Fourier transformer, coupled to the combiner, for Fourier transforming the combined received first signal $r_k$ and the conjugate of the received second signal $(r'_k)^*$ and for generating the information from a subset of the Fourier transformed combined received first signal $r_k$ and the conjugate of the received second signal $(r'_k)^*$.

2. The apparatus of claim 1, wherein:
   the received data stream is represented by N symbols;
   the combined received first signal $r_k$ and the conjugate of the received second signal $(r'_k)^*$ comprises a 2N element vector $[r_k(r'_k)^*]$;

the Fourier transformer generates the information as even output bins of the Fourier transformed 2N element vector $[r_k(r'_k)^*]$.

3. An apparatus for receiving information in a multicarrier communication system, comprising:
   means for receiving a signal having a multiplexed first signal $x_k$ and second signal $x'_k$, the first signal having an orthogonal frequency division multiplexed (OFDM) data stream $d_n$ and the second signal $x'_k$ having a conjugate of the first signal $x_k$;
   means for demultiplexing the received signal to produce a received first signal $r_k$ and a received second signal $r'_k$;
   means for generating a conjugate of the received second signal $(r'_k)^*$; and
   means for generating the information from the received first signal $r_k$ and the conjugate of the received second signal $(r'_k)^*$;
   wherein the first signal and second signal are frequency division multiplexed; and
   wherein the means for demultiplexing the received signal to produce a received first signal $r_k$ and a received second signal $r'_k$ comprises means for downconverting the multiplexed first signal $x_k$ and downconverting the multiplexed second signal $x'_k$ in parallel;
   wherein the first signal $x_k$ is upconverted with a first carrier at a frequency $f_{c_1}$ and the second signal $x'_k$ is up converted with a second carrier of $f_{c_2}$, and wherein the means for downconverting the first signal $x_k$ and downconverting the second signal $x'_k$ in parallel, comprises:
   means for mixing the received signal with a first local oscillating signal having a frequency of $f_{LO_1}=f_{c_1}$; and
   means for mixing the received signal with a second local oscillating signal having a frequency of $f_{LO_2}=f_{c_2}$.

4. A method of receiving information in a multicarrier communication system, comprising the steps of:
   receiving, in a demultiplex receiver module, a signal having a multiplexed first signal $x_k$ and second signal $x'_k$, the first signal having an orthogonal frequency division multiplexed (OFDM) data stream $d_n$ and the second signal $x'_k$ having a conjugate of the first signal $x_k$;
   demultiplexing the received signal in the demultiplex receiver module to produce a received first signal $r_k$ and a received second signal $r'_k$;
   generating a conjugate of the received second signal $(r'_k)^*$ in a signal conjugator; and
   generating the information from the received first signal $r_k$ and the conjugate of the received second signal $(r'_k)^*$ in a conjugate cancellation OFDM demultiplexer, wherein the step of generating the information from the received first signal $r_k$ and the conjugate of the received second signal $r'_k$ comprises the steps of:
   Fourier transforming the received first signal $r_k$;
   Fourier transforming the conjugate of the received second signal $(r'_k)^*$;
   combining the Fourier transformed received first signal $r_k$ and the Fourier transformed conjugate of the received second signal $(r'_k)^*$;
   demodulating the Fourier transformed received first signal $r_k$ and the Fourier transformed conjugate of the received second signal $(r'_k)^*$; and
   generating the information from the demodulated Fourier transformed received first signal $r_k$ and the Fourier transformed conjugate of the received second signal $(r'_k)^*$.

5. A method of receiving information in a multicarrier communication system, comprising the steps of:
   receiving, in a demultiplex receiver module, a signal having a multiplexed first signal $x_k$ and second signal $x'_k$, the first signal having an orthogonal frequency division multiplexed (OFDM) data stream $d_n$ and the second signal $x'_k$ having a conjugate of the first signal $x_k$;
   demultiplexing the received signal in the demultiplex receiver module to produce a received first signal $r_k$ and a received second signal $r'_k$;
   generating a conjugate of the received second signal $(r'_k)^*$ in a signal conjugator; and
   generating the information from the received first signal $r_k$ and the conjugate of the received second signal $(r'_k)^*$ in a conjugate cancellation OFDM demultiplexer, wherein the step of generating the information from the received first signal $r_k$ and the conjugate of the received second signal $r'_k$ comprises the steps of:
   combining the received first signal $r_k$ and the conjugate of the received second signal $(r'_k)^*$;
   Fourier transforming the combined received first signal $r_k$ and the conjugate of the received second signal $(r'_k)^*$; and
   generating the information as the subset of the Fourier transformed received first signal $r_k$ and the conjugate of the received second signal $(r'_k)^*$.

6. The method of claim 5, wherein:
   the received data stream is represented by N symbols;
   the combined received first signal $r_k$ and the conjugate of the received second signal $r'_k$, $\bar{r}_k$, comprises a 2N element vector $[r_k(r'_k)^*]$; and
   the step of generating the information as the subset of the Fourier transformed received first signal $r_k$ and the conjugate of the received second signal $(r'_k)^*$ comprises the step of providing even output bins of the Fourier transformed 2N element vector $[r_k(r'_k)^*]$.

7. A method of receiving information in a multicarrier communication system, comprising the steps of:
   receiving, in a demultiplex receiver module a signal having a multiplexed first signal $x_k$ and second signal $x'_k$, the first signal having an orthogonal frequency division multiplexed (OFDM) data stream $d_n$ and the second signal $x'_k$ having a conjugate of the first signal $x_k$;
   demultiplexing the received signal in the demultiplex receiver module to produce a received first signal $r_k$ and a received second signal $r'_k$;
   generating a conjugate of the received second signal $(r'_k)^*$ in a signal conjugator; and
   generating the information from the received first signal $r_k$ and the conjugate of the received second signal $(r'_k)^*$ in a conjugate cancellation OFDM demultiplexer;
   wherein:
   the first signal and second signal are frequency division multiplexed;
   the step of demultiplexing the received signal to produce a received first signal $r_k$ and a received second signal $r'_k$ comprises the step of downconverting the multiplexed first signal $x_k$ and downconverting the multiplexed second signal $x'_k$ in parallel or in series;
   the first signal $x_k$ is upconverted with a first carrier at a frequency of $f_{c_1}$ and the second signal $x'_k$ is upconverted with a second carrier of $f_{c_2}$, and
   the step of downconverting the first signal $x_k$ and downconverting the second signal $x'_k$ in parallel, comprises the steps of:
   mixing the received signal with a first local oscillating signal having a frequency of $f_{LO_1}=f_{c_1}$; and mixing the received signal with a second local oscillating signal having a frequency of $f_{LO_2}=f_{c_2}$.

8. The method of claim 7, wherein the step of generating the information from the received first signal $r_k$ and the conjugate of the received second signal $r'_k$ comprises the steps of:
Fourier transforming the received first signal $r_k$;
Fourier transforming the conjugate of the received second signal $(r'_k)^*$;
demodulating the Fourier transformed received first signal $r_k$ to generate a first received data stream $\hat{d}_m$; and
demodulating the Fourier transformed conjugate of the received second signal $(r'_k)^*$ to generate a second received data stream $\hat{d}'_m$;
combining the first received data stream $\hat{d}_m$ and the a second received data stream $\hat{d}'_m$; and
generating the information from the combined first received data stream $\hat{d}_m$ and the second received data stream $\hat{d}'_m$.

9. An apparatus for receiving information in a multicarrier communication system, comprising:
a demultiplex receiver module, for receiving and demultiplexing a signal having a multiplexed first signal $x_k$ and a second signal $x'_k$, the first signal $x_k$ having an orthogonal frequency division multiplexed (OFDM) data stream $d_n$ and the second signal $x'_k$ having a conjugate of the first signal $x_k$ to produce a first received first signal $r_k$ and a received second signal $r'_k$;
a signal conjugator, coupled to the demultiplexer module, for generating a conjugate of the received second signal $(r'_k)^*$; and
a conjugate cancellation orthogonal frequency division multiplexed (CCOFDM) demultiplexer, for generating the information from the received first signal $r_k$ and the conjugate of the received second signal $(r'_k)^*$;
wherein the demultiplex receiver module comprises:
a downconverter for downconverting the signal to produce the multiplexed received first signal $r_k$ and second signal $r'_k$; and
a demultiplexer, communicatively coupled to the downconverter, for demultiplexing the received first signal $r_k$ and the received second signal $r'_k$.

10. The apparatus of claim 9, wherein the CCOFDM demultiplexer comprises:
a combiner, for combining the received first signal $r_k$ and the conjugate of the received second signal $(r'_k)^*$; and
a Fourier transformer, coupled to the combiner, for Fourier transforming the combined received first signal $r_k$ and the conjugate of the received second signal $(r'_k)^*$ and for generating the information from a subset of the Fourier transformed combined received first signal $r_k$ and the conjugate of the received second signal $(r'_k)^*$.

11. The apparatus of claim 10, wherein:
the received data stream is represented by N symbols;
the combined received first signal $r_k$ and the conjugate of the received second signal $(r'_k)^*$ comprises a 2N element vector $[r_k(r'_k)^*]$; and
the Fourier transformer generates the information as even output bins of the Fourier transformed 2N element vector $[r_k(r'_k)^*]$.

12. The apparatus of claim 11, wherein the first and second signals $x_k$, $x'_k$ are code division multiplexed.

13. The apparatus of claim 11, wherein the first and second signals $x_k$, $x'_k$ are time division multiplexed.

14. An apparatus for receiving information in a multicarrier communication system, comprising:
a demultiplex receiver module, for receiving and demultiplexing a signal having a multiplexed first signal $x_k$ and a second signal $x'_k$, the first signal $x_k$ having an orthogonal frequency division multiplexed (OFDM) data stream $d_n$ and the second signal $x'_k$ having a conjugate of the first signal $x_k$ to produce a first received first signal $r_k$ and a received second signal $r'_k$;
a signal conjugator, coupled to the demultiplexer module, for generating a conjugate of the received second signal $(r'_k)^*$; and
a conjugate cancellation orthogonal frequency division multiplexed (CCOFDM) demultiplexer, for generating the information from the received first signal $r_k$ and the conjugate of the received second signal $(r'_k)^*$;
wherein the CCOFDM demultiplexer comprises:
a Fourier transformer, communicatively coupled to the demultiplex receiver module and the signal conjugator, for generating a Fourier transform of the first received signal $r_k$ and the conjugate of the received second signal $(r'_k)^*$;
a demodulator, communicatively coupled to the Fourier transformer, for demodulating the Fourier transformed received first signal $r_k$ to a first received data stream $\hat{d}_m$ and for demodulating the Fourier transformed conjugate of the second received signal $(r'_k)^*$ to a second received data stream $\hat{d}'_m$; and
a combiner, coupled to the demodulator, for combining the first received data stream $\hat{d}_m$ and the second received data stream $\hat{d}'_m$ to generate the information.

15. The apparatus of claim 14, wherein the demultiplex receiver module comprises first downconverter for downconverting the signal to produce the received first signal $r_k$ and a second downconverter for downconverting the signal to produce the received second signal $r'_k$.

16. The apparatus of claim 14, wherein the demultiplex receiver module comprises:
a downconverter for downconverting the signal to produce the multiplexed received first signal $r_k$ and second signal $r'_k$; and
a demultiplexer, communicatively coupled to the downconverter, for demultiplexing the received first signal $r_k$ and the received second signal $r'_k$.

17. The apparatus of claim 16, wherein the first and second signals $x_k$, $x'_k$ are code division multiplexed.

18. The apparatus of claim 16, wherein the first and second signals $x_k$, $x'_k$ are time division multiplexed.

19. An apparatus for receiving information in a multicarrier communication system, comprising:
a demultiplex receiver module, for receiving and demultiplexing a signal having a multiplexed first signal $x_k$ and a second signal $x'_k$, the first signal $x_k$ having an orthogonal frequency division multiplexed (OFDM) data stream $d_n$ and the second signal $x'_k$ having a conjugate of the first signal $x_k$ to produce a first received first signal $r_k$ and a received second signal $r'_k$;
a signal conjugator, coupled to the demultiplexer module, for generating a conjugate of the received second signal $(r'_k)^*$; and
a conjugate cancellation orthogonal frequency division multiplexed (CCOFDM) demultiplexer, for generating the information from the received first signal $r_k$ and the conjugate of the received second signal $(r'_k)^*$;
wherein the CCOFDM demultiplexer comprises:
a Fourier transformer, communicatively coupled to the demultiplex receiver module and the signal conjugator, for generating a Fourier transform of the first received signal $r_k$ and the conjugate of the received second signal $(r'_k)^*$;

a combiner, coupled to the Fourier transformer, for combining the Fourier transform of the first received signal $r_k$ and the Fourier transform of the conjugate of the received second signal $(r'_k)^*$;

a demodulator, communicatively coupled to the combiner, for demodulating the combined Fourier transform of the first received signal $r_k$ and the Fourier transform of the conjugate of the received second signal $(r'_k)^*$ to generate the information.

20. The apparatus of claim 19, wherein the demultiplex receiver module comprises first downconverter for downconverting the signal to produce the received first signal $r_k$ and a second downconverter for downconverting the signal to produce the received second signal $r'_k$.

21. The apparatus of claim 19, wherein the demultiplex receiver module comprises:

a downconverter for downconverting the signal to produce the multiplexed received first signal $r_k$ and second signal $r'_k$; and a demultiplexer, communicatively coupled to the downconverter, for demultiplexing the received first signal $r_k$ and the received second signal $r'_k$.

22. The apparatus of claim 21, wherein the first and second signals $x_k$, $x'_k$ are code division multiplexed.

23. The apparatus of claim 21, wherein the first and second signals $x_k$, $x'_k$ are time division multiplexed.

24. An apparatus for receiving information in a multicarrier communication system, comprising:

means for receiving a signal having a multiplexed first signal $x_k$ and second signal $x'_k$, the first signal having an orthogonal frequency division multiplexed (OFDM) data stream $d_n$ and the second signal $x'_k$ having a conjugate of the first signal $x_k$;

means for demultiplexing the received signal to produce a received first signal $r_k$ and a received second signal $r'_k$;

means for generating a conjugate of the received second signal $(r'_k)^*$; and means for generating the information from the received first signal $r_k$ and the conjugate of the received second signal $(r'_k)^*$;

wherein the means for generating the information from the received first signal $r_k$ and the conjugate of the received second signal $r'_k$ comprises:

means for Fourier transforming the received first signal $r_k$;

means for Fourier transforming the conjugate of the received second signal $(r'_k)^*$;

means for demodulating the Fourier transformed received first signal $r_k$ to generate a first received data stream $\hat{d}_m$;

means for demodulating the Fourier transformed conjugate of the received second signal $(r'_k)^*$ to generate a second received data stream $\hat{d}'_m$;

means for combining the first received data stream $\hat{d}_m$ and the a second received data stream $\hat{d}'_m$; and means for generating the information from the combined first received data stream $\hat{d}_m$ and the second received data stream $\hat{d}'_m$.

25. The apparatus of claim 24, wherein the first signal $x_k$ and the second signal $x'_k$ are time-division multiplexed, and wherein the means for demultiplexing the received signal to produce a received first signal $r_k$ and a received second signal $r'_k$ comprises:

means for downconverting the received signal to recover the multiplexed first signal $x_k$ and the second signal $x'_k$; and means for time division demultiplexing the demodulated received signal to produce a received first signal $r_k$ and a received second signal $r'_k$.

26. The apparatus of claim 24, wherein the first signal $x_k$ and the second signal $x'_k$ are code-division multiplexed, and wherein the means for demultiplexing the received signal to produce a received first signal $r_k$ and a received second signal $r'_k$ comprises:

means for downconverting the received signal to recover the multiplexed first signal $x_k$ and the second signal $x'_k$; and means for code division demultiplexing the demodulated received signal to produce a received first signal $r_k$ and a received second signal $r'_k$.

27. An apparatus for receiving information in a multicarrier communication system, comprising:

means for receiving a signal having a multiplexed first signal $x_k$ and second signal $x'_k$, the first signal having an orthogonal frequency division multiplexed (OFDM) data stream $d_n$ and the second signal $x'_k$ having a conjugate of the first signal $x_k$;

means for demultiplexing the received signal to produce a received first signal $r_k$ and a received second signal $r'_k$;

means for generating a conjugate of the received second signal $(r'_k)^*$; and means for generating the information from the received first signal $r_k$ and the conjugate of the received second signal $(r'_k)^*$;

wherein the means for generating the information from the received first signal $r_k$ and the conjugate of the received second signal $r'_k$ comprises:

means for combining the received first signal $r_k$ and the conjugate of the received second signal $(r'_k)^*$;

means for Fourier transforming the combined received first signal $r_k$ and the conjugate of the received second signal $(r'_k)^*$; and means for generating the information as the subset of the Fourier transformed received first signal $r_k$ and the conjugate of the received second signal $(r'_k)^*$.

28. The apparatus of claim 27, wherein:

the received data stream is represented by N symbols;

the combined received first signal $r_k$ and the conjugate of the received second signal $r'_k$, $\bar{r}_k$, comprises a 2N element vector $[r_k(r'_k)^*]$; and the means for generating the information as the subset of the Fourier transformed received first signal $r_k$ and the conjugate of the received second signal $(r'_k)^*$ comprises means for providing even output bins of the Fourier transformed 2N element vector $[r_k(r'_k)^*]$.

29. An apparatus for receiving information in a multicarrier communication system, comprising:

means for receiving a signal having a multiplexed first signal $x_k$ and second signal $x'_k$, the first signal having an orthogonal frequency division multiplexed (OFDM) data stream $d_n$ and the second signal $x'_k$ having a conjugate of the first signal $x_k$;

means for demultiplexing the received signal to produce a received first signal $r_k$ and a received second signal $r'_k$;

means for generating a conjugate of the received second signal $(r'_k)^*$; and means for generating the information from the received first signal $r_k$ and the conjugate of the received second signal $(r'_k)^*$;

wherein the means for generating the information from the received first signal $r_k$ and the conjugate of the received second signal $r'_k$ comprises:

means for Fourier transforming the received first signal $r_k$;

means for Fourier transforming the conjugate of the received second signal $(r'_k)^*$;

means for combining the Fourier transformed received first signal $r_k$ and the Fourier transformed conjugate of the received second signal $(r'_k)^*$;

means for demodulating the Fourier transformed received first signal $r_k$ and the Fourier transformed conjugate of the received second signal $(r'_k)^*$; and means for generating the information from the demodulated Fourier transformed received first signal $r_k$ and the Fourier transformed conjugate of the received second signal $(r'_k)^*$.

30. An apparatus for receiving information in a multicarrier communication system, comprising:

a demultiplex receiver module, for receiving and demultiplexing a signal having a multiplexed first signal $x_k$ and a second signal $x'_k$, the first signal $x_k$ having an orthogonal frequency division multiplexed (OFDM) data stream $d_n$ and the second signal $x'_k$ having a conjugate of the first signal $x_k$ to produce a first received first signal $r_k$ and a received second signal $r'_k$;

a signal conjugator, coupled to the demultiplexer module, for generating a conjugate of the received second signal $(r'_k)^*$; and a conjugate cancellation orthogonal frequency division multiplexed (CCOFDM) demultiplexer, for generating the information from the received first signal $r_k$ and the conjugate of the received second signal $(r'_k)^*$;

wherein the demultiplex receiver module comprises a first downconverter for downconverting the signal to produce the received first signal $r_k$ and a second downconverter for downconverting the signal to produce the received second signal $r'_k$;

wherein the CCOFDM demultiplexer comprises:

a Fourier transformer, communicatively coupled to the demultiplex receiver module and the signal conjugator, for generating a Fourier transform of the first received signal $r_k$ and the conjugate of the received second signal $(r'_k)^*$;

a demodulator, communicatively coupled to the Fourier transformer, for demodulating the Fourier transformed received first signal $r_k$ to a first received data stream $\hat{d}_m$ and for demodulating the Fourier transformed conjugate of the second received signal $(r'_k)^*$ to a second received data stream $\hat{d}'_m$; and a combiner, coupled to the demodulator, for combining the first received data stream $\hat{d}_m$ and the second received data stream $\hat{d}'_m$ to generate the information.

31. An apparatus for receiving information in a multicarrier communication system, comprising:

a demultiplex receiver module, for receiving and demultiplexing a signal having a multiplexed first signal $x_k$ and a second signal the $x'_k$, first signal $x_k$ having an orthogonal frequency division multiplexed (OFDM) data stream $d_n$ and the second signal $x'_k$ having a conjugate of the first signal $x_k$ to produce a first received first signal $r_k$ and a received second signal $r'_k$;

a signal conjugator, coupled to the demultiplexer module, for generating a conjugate of the received second signal $(r'_k)^*$; and a conjugate cancellation orthogonal frequency division multiplexed (CCOFDM) demultiplexer, for generating the information from the received first signal $r_k$ and the conjugate of the received second signal $(r'_k)^*$ wherein the demultiplex receiver module comprises a first downconverter for downconverting the signal to produce the received first signal $r_k$ and a second downconverter for downconverting the signal to produce the received second signal $r'_k$;

wherein the CCOFDM demultiplexer comprises:

a Fourier transformer, communicatively coupled to the demultiplex receiver module and the signal conjugator, for generating a Fourier transform of the first received signal $r_k$ and the conjugate of the received second signal $(r'_k)^*$;

a combiner, coupled to the Fourier transformer, for combining the Fourier transform of the first received signal $r_k$ and the Fourier transform of the conjugate of the received second signal $(r'_k)^*$;

a demodulator, communicatively coupled to the combiner, for demodulating the combined Fourier transform of the first received signal $r_k$ and the Fourier transform of the conjugate of the received second signal $(r'_k)^*$ to generate the information.

32. An apparatus for receiving information in a multicarrier communication system, comprising:

means for receiving a signal having a multiplexed first signal $x_k$ and second signal $x'_k$, the first signal having an orthogonal frequency division multiplexed (OFDM) data stream $d_n$ and the second signal $x'_k$ having a conjugate of the first signal $x_k$;

means for demultiplexing the received signal to produce a received first signal $r_k$ and a received second signal $r'_k$;

means for generating a conjugate of the received second signal $(r'_k)^*$; and means for generating the information from the received first signal $r_k$ and the conjugate of the received second signal $(r'_k)^*$;

wherein the first signal and second signal are frequency division multiplexed; and wherein the means for demultiplexing the received signal to produce a received first signal $r_k$ and a received second signal $r'_k$ comprises means for downconverting the multiplexed first signal $x_k$ and downconverting the multiplexed second signal $x'_k$ in parallel;

wherein the means for generating the information from the received first signal $r_k$ and the conjugate of the received second signal $r'_k$ comprises:

means for Fourier transforming the received first signal $r_k$;

means for Fourier transforming the conjugate of the received second signal $(r'_k)^*$;

means for demodulating the Fourier transformed received first signal $r_k$ to generate a first received data stream $\hat{d}_m$;

means for demodulating the Fourier transformed conjugate of the received second signal $(r'_k)^*$ to generate a second received data stream $\hat{d}'_m$;

means for combining the first received data stream $\hat{d}_m$ and the a second received data stream $\hat{d}'_m$; and means for generating the information from the combined first received data stream $\hat{d}_m$ and the second received data stream $\hat{d}'_m$.

33. An apparatus for receiving information in a multicarrier communication system, comprising:

means for receiving a signal having a multiplexed first signal $x_k$ and second signal $x'_k$, the first signal having an orthogonal frequency division multiplexed (OFDM) data stream $d_n$ and the second signal $x'_k$ having a conjugate of the first signal $x_k$;

means for demultiplexing the received signal to produce a received first signal $r_k$ and a received second signal $r'_k$;

means for generating a conjugate of the received second signal $(r'_k)^*$; and means for generating the information from the received first signal $r_k$ and the conjugate of the received second signal $(r'_k)^*$;

wherein the first signal and second signal are frequency division multiplexed;

wherein the means for demultiplexing the received signal to produce a received first signal $r_k$ and a received second signal $r'_k$ comprises means for downconverting the multiplexed first signal $x_k$ and downconverting the multiplexed second signal $x'_k$ in parallel; and wherein the means for generating the information from the received first signal $r_k$ and the conjugate of the received second signal $r'_k$ comprises:

means for combining the received first signal $r_k$ and the conjugate of the received second signal $(r'_k)^*$;

means for Fourier transforming the combined received first signal $r_k$ and the conjugate of the received second signal $(r'_k)^*$; and means for generating the information as the subset of the Fourier transformed received first signal $r_k$ and the conjugate of the received second signal $(r'_k)^*$.

34. The apparatus of claim 33, wherein:

the received data stream is represented by N symbols;

the combined received first signal $r_k$ and the conjugate of the received second signal $r'_k$, $\bar{r}_k$, comprises a 2N element vector $[r_k(r'_k)^*]$; and the means for generating the information as the subset of the Fourier transformed received first signal $r_k$ and the conjugate of the received second signal $(r'_k)^*$ comprises means for providing even output bins of the Fourier transformed 2N element vector $[r_k(r'_k)^*]$.

35. An apparatus for receiving information in a multicarrier communication system, comprising:

means for receiving a signal having a multiplexed first signal $x_k$ and second signal $x'_k$, the first signal having an orthogonal frequency division multiplexed (OFDPM) data stream $d_n$ and the second signal $x'_k$ having a conjugate of the first signal $x_k$;

means for demultiplexing the received signal to produce a received first signal $r_k$ and a received second signal $r'_k$;

means for generating a conjugate of the received second signal $(r'_k)^*$; and means for generating the information from the received first signal $r_k$ and the conjugate of the received second signal $(r'_k)^*$;

wherein the first signal and second signal are frequency division multiplexed;

wherein the means for demultiplexing the received signal to produce a received first signal $r_k$ and a received second signal $r'_k$ comprises means for downconverting the multiplexed first signal $x_k$ and downconverting the multiplexed second signal $x'_k$ in parallel; and wherein the means for generating the information from the received first signal $r_k$ and the conjugate of the received second signal $r'_k$ comprises:

means for Fourier transforming the received first signal $r_k$;

means for Fourier transforming the conjugate of the received second signal $(r'_k)^*$;

means for combining the Fourier transformed received first signal $r_k$ and the Fourier transformed conjugate of the received second signal $(r'_k)^*$;

means for demodulating the Fourier transformed received first signal $r_k$ and the Fourier transformed conjugate of the received second signal $(r'_k)^*$; and means for generating the information from the demodulated Fourier transformed received first signal $r_k$ and the Fourier transformed conjugate of the received second signal $(r'_k)$.

* * * * *